United States Patent [19]

Matsufuji

[11] Patent Number: 5,690,001

[45] Date of Patent: Nov. 25, 1997

[54] TRANSMISSION ASSEMBLY FOR TRACTORS

[75] Inventor: Mizuya Matsufuji, Sanda, Japan

[73] Assignee: Kanzaki Kokyukoki Mfg. Co., Ltd., Amagasaki, Japan

[21] Appl. No.: 671,511

[22] Filed: Jun. 27, 1996

Related U.S. Application Data

[63] Continuation of Ser. No. 441,438, May 15, 1995, Pat. No. 5,599,247.

[30] Foreign Application Priority Data

Jun. 15, 1994 [JP] Japan ................... 6-158090
Dec. 6, 1994 [JP] Japan ................... 6-330106

[51] Int. Cl.$^6$ ........................... F16H 61/26; F16H 57/02
[52] U.S. Cl. ........................... 74/606 R; 74/335
[58] Field of Search ................ 74/606 R, 331, 74/335

[56] References Cited

U.S. PATENT DOCUMENTS

| | | | |
|---|---|---|---|
| 3,613,481 | 10/1971 | Lapinski | 74/606 R |
| 3,810,519 | 5/1974 | Galos et al. | 74/606 R |
| 5,058,455 | 10/1991 | Nemoto et al. | 74/606 R |
| 5,404,772 | 4/1995 | Jester | 74/606 R |
| 5,544,547 | 8/1996 | Ishimaru | 74/606 R |
| 5,570,605 | 11/1996 | Kitagawara et al. | 74/606 R |

FOREIGN PATENT DOCUMENTS

| | | | |
|---|---|---|---|
| 61-116172 | 6/1986 | Japan | 74/606 R |
| 61-165086 | 7/1986 | Japan | 74/606 R |
| 5-231503 | 9/1993 | Japan | 74/606 R |
| 2258020 | 1/1993 | United Kingdom | 74/606 R |

*Primary Examiner*—Khoi Q. Ta

[57] ABSTRACT

A bearing support frame (4) is disposed within a rear end portion of a tractor front housing (1) and is fixedly supported by this housing which has an internal partition wall (1a) and an open rear end. An additional speed change mechanism (12) having plural fluid-operated clutches (54F, 54R) mounted on a primary shaft (7) of a high level which extends through the partition wall is disposed within a rear half of the front housing such that it is operable to perform a speed change transmission between the primary shaft and a co-axial output shaft (10) supported by the support frame. Fluid supply passages (55F, 55R, 55L) in the primary shaft are connected to fluid supply passages (61F, 61R, 61L) in the partition wall through annular fluid chambers (60F, 60R, 60L) defined between the primary shaft and a hollow cylindrical portion (37) of the partition wall. A control valve assembly (63) supported by the front housing extends through a side wall of this housing and includes a directional control valve (78), pressure-reducing valve (83), modulating relief valve (86), and lubricant regulator valves (90, 91).

25 Claims, 21 Drawing Sheets

TRANSMISSION ASSEMBLY FOR TRACTORS

This is a continuation of application Ser. No 08/441,438, filed May 15, 1995, now U.S. Pat. No 5,599,247, the text of which is hereby incorporated by reference.

FIELD OF THE INVENTION

This invention relates a transmission assembly for tractors of a type having a front housing which is fastened to a front of a transmission casing so as to form a part of the vehicle body together with this casing and within which an additional speed change mechanism is disposed at a rear half of the housing.

BACKGROUND OF THE INVENTION

As a transmission assembly of the type set forth above, there is disclosed in U.S. Pat. No. 5,058,455 a transmission assembly which facilitates the assembly of an additional speed change mechanism into the front housing and also the assembly of a main speed change transmission into the transmission casing. In the transmission assembly shown in this U.S. patent, the front housing is fashioned to have an open rear end and the transmission casing is fashioned to have an open front end. A bearing support frame is disposed within a rear end portion of the front housing and is fixedly secured to internal bosses which are projected inwardly from a front end portion of the transmission casing. An internal partition wall of the front housing and the bearing support frame are employed as shaft-supporting members for the additional speed change mechanism which is disposed within a rear half of the front housing. The bearing support frame is also employed as a support member for supporting front ends of a drive shaft and speed-change shaft of the main speed change transmission which is disposed within the transmission casing. The additional change mechanism disposed within the front housing is fashioned such that it performs a speed change transmission between a primary shaft driven by engine and an output shaft which is disposed co-axially with the primary shaft and is supported by the bearing support frame. The output shaft is coupled to the drive shaft, set forth above, at an inside of the bearing support frame. Two embodiments are shown in which the change mechanism within the front housing is of a fluid-operated type having plural fluid-operated clutches, while an embodiment is shown in which the change mechanism within the front housing is of a mechanical type having mechanically operated clutches. In each of these embodiments, an intermediate shaft is disposed below the co-axial primary shaft and output shaft, and the fluid-operated clutches or mechanically operated clutches set forth above are mounted on this intermediate shaft.

With respect to the structure in which a fluid-operated speed change mechanism is disposed within a rear half of the front housing, the prior art transmission shown in this U.S. patent involves some points to be improved. First, because the fluid-operated change mechanism comprises plural fluid-operated clutches having relatively large size and large weight, it is desirable to assemble this mechanism into the front housing fully in advance and then to install the front housing onto a front of the transmission casing. However, the bearing support frame set forth above does not allow such a previous full assembly with respect to the front housing because this support frame is designed as a member to be supported by the transmission casing.

Second, a rear half of the front housing within which a speed change mechanism is disposed must contain lubricant oil for lubricating various elements of the change mechanism. When fluid-operated clutches of a fluid-operated change mechanism are mounted on an intermediate shaft of a low level as is the case of the transmission assembly shown in the U.S. patent set forth above, the respective fluid-operated clutches or their clutch cylinders are in part immersed in the lubricant oil. Consequently, the clutch cylinders will rotate through viscous lubricant oil so that excessive energy is wasted. Further, lubricant oil will enter the clutch cylinders and will exist between frictional elements of the driving and driven sides in the fluid-operated clutches as viscous oil films. Because of this, even in a neutral condition of the change mechanism where all of the clutches are disengaged, a drag effect by the lubricant will cause rotation of the frictional elements of driven side so that wear of the frictional elements is enhanced and even an unexpected start of the vehicle may be caused. From this, it is considered to arrange the intermediate shaft at a high level while arranging the primary shaft at a low level. However, such an arrangement of shafts is impractical because arrangement of the primary shaft driven by engine is restrained by the arrangement of engine so that the level of primary shaft cannot be made so low and because, if a gear mechanism for lowering the level of primary shaft is disposed between the engine output shaft and primary shaft, the transmission assembly becomes complicated in structure and high in cost.

Further, it is not so easy to mount fluid-operated clutches on the primary shaft of a high level. That is, plural fluid passages to be formed in a clutch-carrying shaft for supplying operating fluid and lubricant fluid to the clutches will be rotationally displaced with the rotating shaft so that such passages require rotary joints for connecting them to fluid passages which are fixed in position. In the transmission assembly disclosed in the U.S. patent set forth above, plural annular fluid chambers constituting such rotary joints are defined between the intermediate shaft and the bearing support frame which supports a rear end portion of this shaft. A similar structure cannot be employed in a transmission assembly in which plural fluid-operated cluches are mounted on the primary shaft. This is because the output shaft set forth above which is supported by the bearing support frame is disposed behind the primary shaft so that it is almost impossible to provide plural annular fluid chambers by difining them between the primary shaft and bearing support frame without being interefered with by the output shaft. It may be considered to provide such rotary joints or annular fluid chambers at the side of the internal partition wall of front housing set forth above which supports the primary shaft at its axial mid portion. However, some difficulties are anticipated from the structure shown in the U.S. patent. That is, the structure shown makes use of an end portion of a shaft (intermediate shaft referred to above) supported by the bearing support frame for providing rotary joints of fluid passages, whereas it is a mid portion of the primary shaft that is supported by the partition wall. Further, in the structure shown in the U.S. patent, valves including a directional control valve for controlling the operation of the fluid-operated change mechanism are arranged either on an upper surface of the bearing support frame or within this frame and fluid passages between these valves and the annular fluid chambers are formed in the bearing support frame. It is anticipated very difficult to employ a similar structure by making use of the partition wall which is integral with the front housing and is located within this housing.

The arrangement of valves set forth above is advantageous in that valves associated with the fluid-operated speed change mechanism can be preassembled onto or into the bearing support frame at an outside of the front housing and can be assembled into this housing together with the change mechanism. However, a preassembly including therein various valves is large in weight so that the preassembly is difficult to handle in assembling into the front housing. Further, it is desirable for assuring a reliable operation and high durability of valves to provide a filter which is operable to remove foreign matters, such as fine metal chips produced during the machining process of fluid passages, from fluid flowing into valves. However, when such a filter is incorporated in the bearing support frame set forth above, it is impossible to access the filter for inspection and maintenance thereof without deassembling the transmission.

The valves set forth above employed in the transmission assembly disclosed in the U.S. patent include a pressure-reducing valve which is operable, when operated by a pedal, to reduce fluid pressure applied to a fluid-operated clutch under operation so as to cause a slipping engagement of the clutch and to thereby provide a variable creeping speed for the vehicle. It is fashioned that lubricant fluid is supplied to the fluid-operated clutches through the reducing valve which in turn is fashioned to throttle at its pressure-reducing position the flow of lubricant fluid for the purpose of avoiding the drag effect caused in the clutch by lubricant fluid and thereby avoiding influence of the drag effect on a precise control of the creeping speed. The reducing valve is further fashioned such that it includes a pressure-unloading position for unloading fluid pressure applied to the clutch so as to stop the vehicle and such that supply of lubricant fluid is cut off at the unloading position of this valve for preventing an unexpected start of the vehicle due to the drag effect caused by lubricant fluid. According to this structure, supply of lubricant fluid is reopened firstly when the reducing valve is returned to its non-reducing position so that cooling-off or removal of heat generated during the slipping engagement of clutch tends to be delayed. Further, too much lubricant can be supplied during a normal operation state of the clutch, so that energy loss can be caused due to stirring or agitation of viscous lubricant fluid by the rotating frictional elements of clutch under engagement.

Accordingly, a primary object of the present invention is to provide a novel transmission assembly for tractors in which a fluid-operated speed change mechanism is provided so as to assemble it into a rear half of a front housing in advance in a fully assembled condition while securing easiness of the assembly of a speed change transmission into a transmission casing.

An attendant object of the invention is to provide a novel transmission assembly in which plural fluid-operated clutches for the fluid-operated change mechanism are mounted on a primary shaft by overcoming various difficulties such as the ones set forth above.

Another attendant object of the present invention is to provide a transmission assembly in which a control valve assembly, including a directional control valve, for controlling the operation of the fluid-operated change mechanism is provided in a fashion so as to simplify fluid passage structure between the change mechanism and valve assembly.

Still another attendant object of the invention is to provide a transmission assembly in which a filter for removing foreign matters from fluid flowing into the control valve assembly is provided in a simple and easily accessible fashion. It is also an object of the present invention to provide this filter in such a way that it is operable also as a bypass valve for keeping supply of fluid even when the filter is choked or clogged.

A further object of the present invention is to provide a novel transmission assembly in which a control valve assembly for the fluid-operated speed change mechanism includes a lubricant supply control valve means which is operable to control the supply of lubricant to fluid-operated clutches of the change mechanism properly irrespective of the condition of clutches such as a clutch-disengaged condition, slippingly engaged condition, engagement-proceeding condition or normal operation condition.

SUMMARY OF THE INVENTION

The present invention relates to a transmission assembly for tractors which comprises: a front housing (1) which includes an internal partition wall (1a) and an open rear end; a transmission casing (2) which includes an open font end and is fastened to a rear of the front housing; a bearing support frame (4) which is fixedly disposed within a rear end portion of the front housing; a primary shaft (7) which extends through the partition wall and is supported by the partition wall and by the bearing support frame; an output shaft (10) which is disposed behind and co-axially with the primary shaft and is supported by the bearing support frame; a first speed change mechanism (12) of a fluid-operated type which is disposed within the front housing and behind the partition wall so as to perform a speed change transmission between the primary shaft and the output shaft and which includes at least one intermediate shaft (11) which is supported by the partition wall and by the bearing support frame; and a second speed change mechanism (15) which is disposed within the transmission casing so as to perform a speed change transmission between a drive shaft (13) and speed change shaft (14) which are supported at their front end portions respectively by the bearing support frame. The drive shaft is coupled to the output shaft at an inside of the bearing support frame.

According to the present invention, the bearing support frame (4) set forth above is supported by the front housing (1). A simple structure for this is that the bearing support frame is provided with outwardly extending integral projections (4a) which are secured to bosses (1b) which in turn extend inwardly from a rear end portion of the front housing.

Plural fluid-operated clutches (54F, 54R) of the fluid-operated first speed change mechanism (12) are all mounted, according to the present invention, on the primary shaft (7) set forth above. It is preferred that these clutches are disposed such that they are located above a level of lubricant fluid contained within the front housing (1) at a location behind the partition wall (1a). A hollow cylindrical portion (37) for receiving the primary shaft (7) is formed in the partiton wall (1a), and annular fluid chambers (60F, 60R, 60L) are defined between this cylindrical portion and the primary shaft for connecting clutch-operating fluid passages (55F, 55R) and lubricant passage (55L) in the primary shaft to clutch-operating fluid passages (61F, 61R) and lubricant passage (61L) in the partition wall.

Further, a control valve assembly (63) including a directional control valve (78) for controlling the operation of the first speed change mechanism (12) is fixedly supported by the front housing (1). For an easy connection of fluid passages in the control valve assembly (63) to the fluid passages (61F, 61R, 61L) in the partition wall (1), the control valve assembly is preferably arranged such that a valve housing (64, 66, 67) of this valve assembly is in a close contact at a part thereof with a wall surface (1c) of the front housing so that fluid passages in the valve housing can be formed so as to open at the wall surface (1c) whereby these passages can be connected directly to the fluid passages in the partition wall.

Owing to the structure that the bearing support frame (4) for supporting rear end portions of the primary shaft (7) and intermediate shaft (11) and for supporting the output shaft (10) is fixedly supported, according to the present invention, by the front housing (1), the fluid-operated speed change mechanism (12) can be assembled into a rear half of the front housing in advance in a fully assembled condition by using the partition wall (1a) and bearing support frame (4) as support members therefor. Then the front housing (1) is brought onto a front of the transmission casing (2) such that respective front end portions of the drive shaft (13) and change shaft (14) for the second speed change mechanism (15) within the transmission casing are supported by the bearing support frame (4) and at the same time the drive shaft (13) is connected to the output shaft (10). Further, owing to the structure that a hollow cylindrical portion (32) receiving the primary shaft (7) at its axially mid portion is formed in the internal partition wall (1a) of front housing and the annular fluid chambers (60F, 60R, 60L) constituting rotary joints for fluid passages are provided within the cylindrical portion (32) and owing to the structure that the control valve assembly (63) for the fluid-operated change mechanism (12) is fixedly supported by the front housing (1) so as to permit an easy connection between the fluid passages (61F, 61R, 61L) in the partition wall, which communicate with the annular fluid chambers, and fluid passages in the valve assembly, the present invention has successfully mounted the plural fluid-operated clutches (54F, 54R) for the fluid-operated change mechanism on the primary shaft (7) which is to be arranged at a relatively high level. Owing to this structure, the fluid-operated clutches or their clutch cylinders are arranged so as not to be immersed substantially in lubricant oil contained within a rear half of the front housing (1) so that energy loss due to rotation of the clutch cylinders through viscous lubricant oil is minimized. Also, rotation of frictional elements of the clutches due to drag effect caused by viscous oil entering the clutches is largely reduced.

For the purpose of minimizing the number of shafts and gears for the first speed change mechanism (12) so as to simplify the structure of this change mechanism which is provided additionally using a spare space within the front housing (1), it is preferred to fashion this change mechanism such that it comprises a first gear (49) which is rotatably mounted on the primary shaft (7), a second gear (50) which is fixedly mounted on the intermediate shaft (11) and is adapted to be driven to rotate by the first gear, a third gear (51) which is fixedly mounted on the intermediate shaft (11), and a fourth gear (52) which is fixedly mounted on the output shaft (10) and is adapted to be driven to rotate by the third gear, and such that there are provided as the fluid operated clutches set forth above a first fluid-operated clutch (54R) for coupling the first gear (49) to the primary shaft (7) and a second fluid-operated clutch (54F) for coupling the fourth gear (52) to the primary shaft (7). A high/low speed-selector type change mechanism is provided when the first and second gears (49, 50) and the third and fourth gears (51, 52) are respectively meshed directly, whereas a direction-reversing type change transmission is provided when an idler gear is disposed either between the first and second gears (49, 50) or between the third and fourth gears (51, 52). In the case where an idler gear is provided, it is preferred to dispose this idler gear between the third and fourth gears (51, 52) by using the bearing support frame (4) as a support for the idler gear.

For the purpose of providing a fluid pump for supplying fluid to the fluid-operated clutches (54F, 54R) so that the pump can be fluid-connected to the control valve assembly (63) in a simple fashion, it is preferred that such a fluid pump (72) is mounted on a front surface of the partition wall (1a) and is in a fluid connection with the control valve assembly (63) through a fluid discharge passage (75) which is formed in the partition wall.

In addition to this structure, the valve housing (64, 66, 67) of control valve assembly (63) is preferably arranged so as to be in a close contact at a part thereof with an outer surface (1c) of the front housing (1) and preferably includes a pump port or fluid inlet port (71P) which opens at the outer surface (1c) and is in fluid communication with the fluid discharge passage (75) in the partition wall (1a). In such a structure, a hollow cylindrical filter (200) can be provided in an easily accessible fashion by inserting it in the fluid discharge passage (75) from the side of the valve housing. This filter is located just before the control valve assembly (63) so as to remove foreign matters from fluid supplied to the valve assembly. Consequently, various valves in the valve assembly operate in a reliable manner and are well protected from being damaged.

With the use of the transmission assembly, the filter (200) set forth above can be choked or clogged with foreign matters so that supply of fluid to the valve assembly (63) becomes reduced whereby shortage or interruption of fluid supply to the fluid-operated clutches (54F, 54R) may be caused. In addition, an overload may be applied to the fluid pump at such a choked condition of the filter. From this, it is preferred to support this filter such that it is also operable, when choked, as a by-pass valve which connects the fluid discharge passage (75) directly to the pump port (71P) of valve assembly. According to a preferred feature of the present invention, the filter (200) includes at its outer surface an annular shoulder (207c) which is sealingly engageable with an annular stepped portion (208; 308; 408) formed in an inner circumference of a junction between the fluid discharge passage (75) and the pump port (71P). Further, a spring (209) is provided which is received at its base end by the valve housing (64, 66, 67) and is operable to bias the filter (200) to move so as to engage the annular shoulder (207c) with the stepped portion (208; 308; 408) and to thereby keep the filter in position such that when the filter is moved against the biasing force of the spring the fluid discharge passage (75) is communicated directly to the pump port (71P). When the filter is choked so that pressure differential thereacross is heightened to a predetermined value, it is moved so as to operate as a by-pass valve. The filter can then be taken out for a cleaning or exchanging purpose.

For the purpose of arranging the control valve assembly (63) so as not to occupy a large space at an outside of the front housing (1) and so as to further simplify fluid connection of this valve assembly to the fluid passages in the partition wall (1a), the control valve assembly (63) is preferably arranged such that it extends through an opening (62) in a side wall of the front housing (1) at an axial location behind the partition wall (1a). Valve housing (64, 66, 67) of this valve assembly preferably includes a plate member (64) which is in a close contact with an outer surface (1c) of the side wall set forth above at a front end location of the opening (62). Such a plate member (64) can be provided with clutch-operating fluid ports (71F, 71R) and lubricant port (71L) which open at the side-wall outer surface (1c), and the fluid passages (61F, 61R, 61L) in the partition wall (1a) for connecting between these ports and the annular fluid chambers (60F, 60R, 60L) can be formed as straight passages so as to make machining of them easy. The directional control valve (78) is preferably disposed within the valve housing at a portion located at an outside of the front housing (1) for providing; an operating mechanism for this valve in a simple fashion.

In accordance with another feature of the present invention, the control valve assembly (63) which is fixedly supported by the front housing (1) and includes a directional control valve (78) is fashioned such that it further includes a modulating relief valve (86) for gradually increasing fluid pressure applied to the fluid-operated clutches (54F, 54R) and a lubricant-regulator valve means (90, 91) which is operable to stop the supply of lubricant to the clutches at a disengaged condition of the clutches and to start the supply of lubricant from a slippingly engaged condition of the clutches. The regulator valve means (90, 91) can be fashioned such that this valve means is operable to regulate the supply of lubricant in response to fluid pressure applied to the clutches (54F, 54R).

According to this structure, when the directional control valve (78) is placed in its neutral position so that the fluid-operated change mechanism (12) is in its neutral condition, lubricant is not supplied to the fluid-operated clutches (54F, 54R) so that rotation of the clutch frictional elements due to drag effect by viscous lubricant is avoided whereby wear of the elements and an unexpected start of the vehicle are well prevented. And, during a clutch-operating process which proceeds gradually with the gradual increase in fluid pressure by means of the modulating relief valve (86), because the supply of lubricant starts from a slippingly engaged condition of the clutch and continues after then, heat generated due to the slipping engagement of clutch is cooled off rapidly so that wear of the frictional elements are largely reduced.

In accordance with a further feature of the present invention, the control valve assembly (63) which is fixedly supported by the front housing (1) and includes a directional control valve (78) is fashioned such that it further includes a pressure-reducing valve (83) which is adapted to be operated by a pedal (92) so as to reduce fluid pressure applied to the fluid-operated clutches (54F, 54R), and a lubricant-regulator valve means (90,91) which is operable in response to fluid pressure applied to the clutches (54F, 54R) to stop the supply of lubricant to the clutches at a disengaged condition of the clutches and to start the supply of lubricant from a slippingly engaged condition of the clutches.

According to this structure, an unexpected start of the vehicle is prevented at a condition where the pressure-reducing valve (83) is operated fully so as to keep the fluid-operated clutches in their disengaged conditions by the reducing valve. And, the supply of lubricant starts from a condition where a creeping speed of the vehicle is attained by operating the reducing valve so as to obtain a reduced fluid pressure and to thereby obtain a slipping engagement of a clutch, so that the frictional elements are rapidly cooled. Influence of the drag effect on the control of creeping speed during the time when the vehicle is travelled at a creeping speed by operating the reducing valve can be eliminated by controlling the operation degree of pedal (92) so as to attain a desired creeping speed.

The lubricant-regulator valve means which is used in combination with a modulating relief valve (86) or with a pressure-reducing valve (83) can include an on-off valve (91), which is operable to open and close a lubricant supply path (88) in the control valve assembly (63) selectively in response to fluid pressure applied to the clutch, and/or a flow control valve (90) which is operable to control flow of lubricant flowing through the lubricant supply path (88) in response to fluid pressure applied to the clutch.

The flow control valve (90) set forth above is preferably fashioned such that it is operable to drain a portion of lubricant from the lubricant supply path (88) when fluid pressure applied to the clutches (54F, 54R) has been increased approximately to a normal fluid pressure to be applied to the clutches. According to this valve structure, supply of lubricant can be reduced, when the clutch has reached its normal operation condition, to such a degree enough to cool off the residual heat from the slipping condition of clutch so as to avoid excessive supply of lubricant to the frictional elements of the fully engaged clutch. By this, energy loss due to stirring of lubricant by the frictional elements is minimized. In a case where both of the on-off valve (91) and flow control valve (90) set forth above are provided, the starting time of lubricant supply during a clutch-engaging process and the quantity of lubricant supplied in the normal operation condition of clutch can be determined independently of each other.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 1:
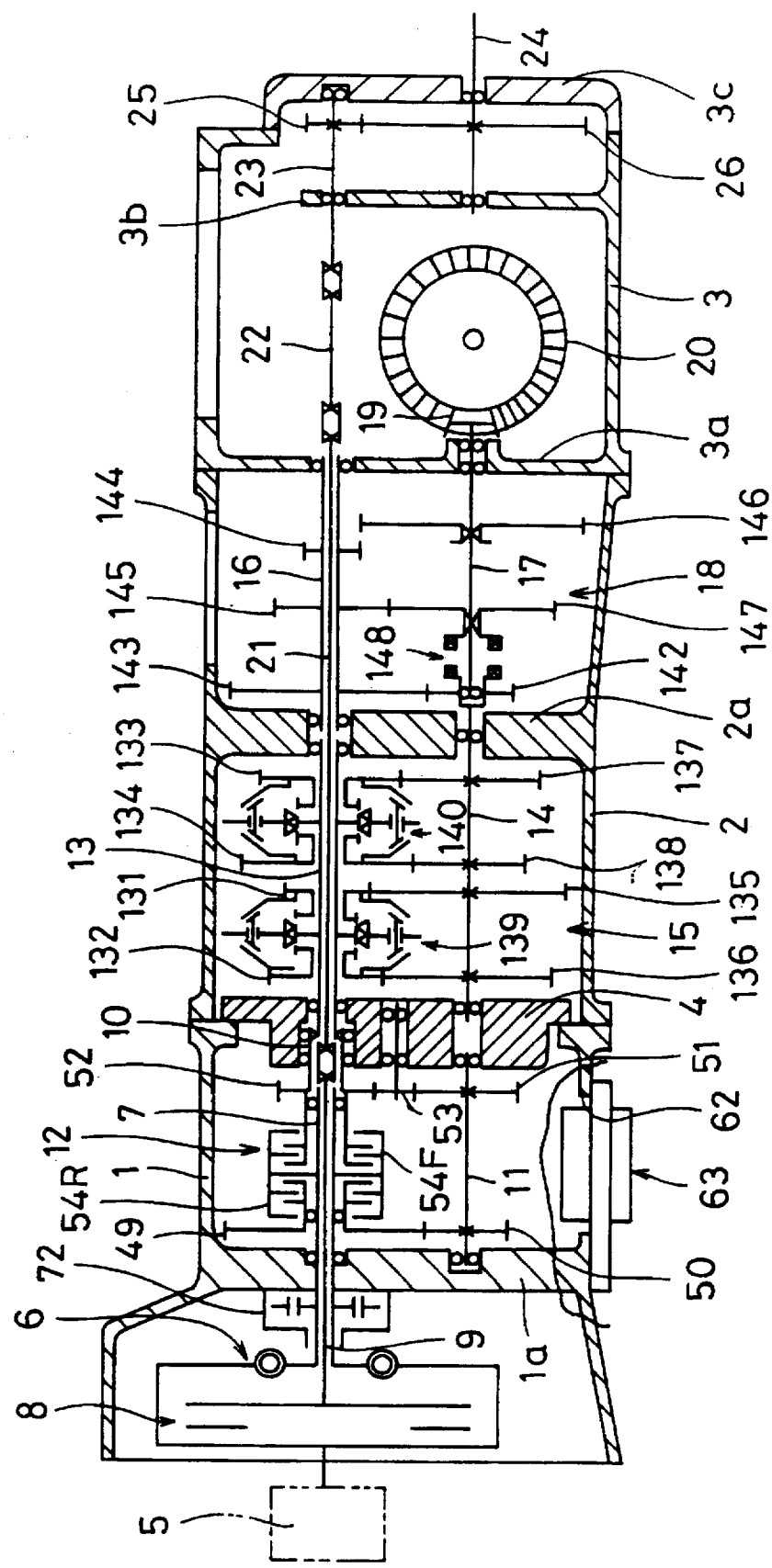
FIG. 1 is a schematic sectional side view, partially developed, showing the whole of transmission system in a tractor in which a preferred embodiment of the transmission assembly according to the present invention is employed.

FIG. 1 shows schematically the whole of the transmission system of a tractor in which a preferred embodiment of the present invention is employed. The vehicle body of the tractor shown is composed of a front housing 1, transmission casing 2 and rear housing 3 which are arranged in series in a longitudinal direction of the tractor and are fastened together. Front housing 1 includes an open front end, an open rear end and an internal partition wall 1a. A bearing support frame 4 which is fixedly secured to a rear of the front housing 1 is disposed within a rear end portion of this housing 1. Transmission casing 2 includes an open front end, an open rear end and an internal support wall 2a. Rear housing 3 includes a front wall 3a, an internal support wall 3b which upstands from the inner bottom of this housing 3, and an open rear end which is closed by a rear end cover 3c.

As also shown in FIG. 1, engine 5 is arranged at a frontmost end of the vehicle body. Within the front housing 1, there are disposed a hollow primary shaft 7 of vehicle drive-power transmission line, which is driven to rotate by engine 5 through a cushion spring mechanism 6, and a primary shaft 9 of power take-off transmission line which is driven to rotate by engine 5 through a power take-off clutch 8. The primary shaft 7 of vehicle drive-power transmission line extends axially of the vehicle through the partition wall 1a, and the primary shaft 9 of power take-off transmission line extends through the hollow primary shaft 7. There are disposed also within the front housing 1 a hollow output shaft 10, which is located behind and co-axially with the primary shaft 7 and is supported by the bearing support frame 4, and an intermediate shaft 11 which is located below shafts 7 and 10 and is supported by the partition wall 1a and by the bearing support frame 4. An additional speed change mechanism 12 is disposed within the front housing 1 and between the partition wall 1a and support frame 4 such that it is operable to perform a speed change transmission between the primary shaft 7 and output shaft 10.

A hollow drive shaft 13 of a higher level and a speed change shaft 14 of a lower level are disposed within the transmission casing 2 and are supported by the bearing support frame 4 and by the support wall 2a, respectively. The drive shaft 13 is coupled to the output shaft 10 at a location within the support frame 4. Within a front half of the transmission casing 2, a primary speed change mechanism 15 is disposed and is operable to perform a speed change transmission between the drive shaft 13 and change shaft 14.

Within a rear half of the transmission casing 2, there are disposed a hollow intermediate shaft 16 which is located behind and co-axially with the drive shaft 13, a propeller shaft 17 which is located behind and co-axially with the change shaft 14, and an auxiliary speed change mechanism 18 which is operable to perform a speed change transmission between the change shaft 14 and propeller shaft 17. Propeller shaft 17 extends into the rear housing 3 and has at its rear end a small bevel gear 19 which is meshed with a larger input bevel gear 20 of a differential gearing for left and right rear wheels (both not shown) so that the vehicle is driven to travel by the drive of the left and right rear wheels.

The primary shaft 9 of power take-off line is connected to a transmission shaft 21 which extends through the hollow drive shaft 13 and intermediate shaft 16, and then to two transmission shafts 22 and 23 which are disposed in series within the rear housing 3. A PTO shaft 24 which is driven to rotate by transmission shaft 23 through speed-reduction meshing gears 25 and 26 is supported by the support wall 3b and by the rear end cover 3c and extends rearwardly from the vehicle body.

Figure 2:
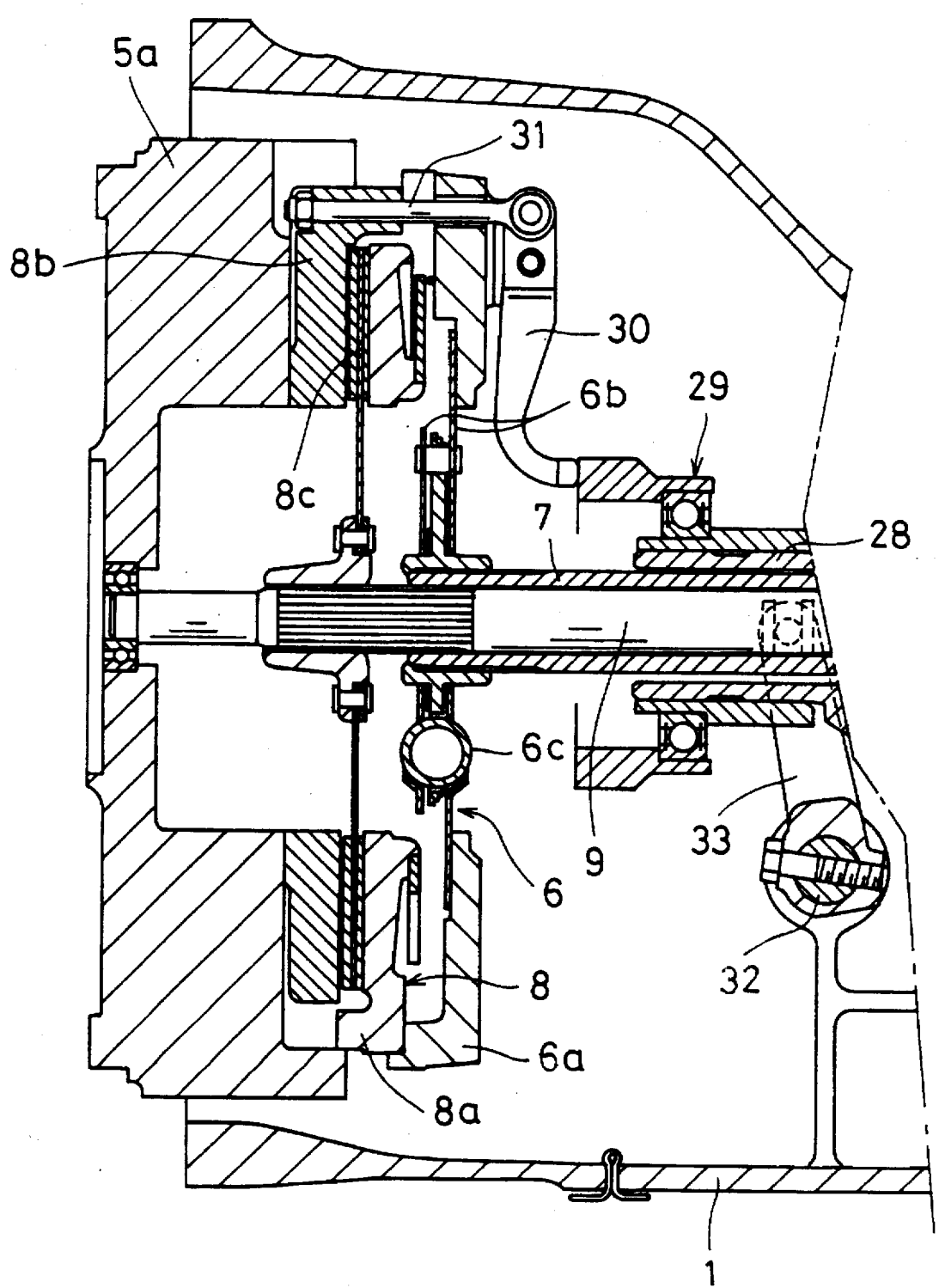
FIG. 2 is a sectional side view showing a front half of a front housing employed in the tractor.
Figure 3:
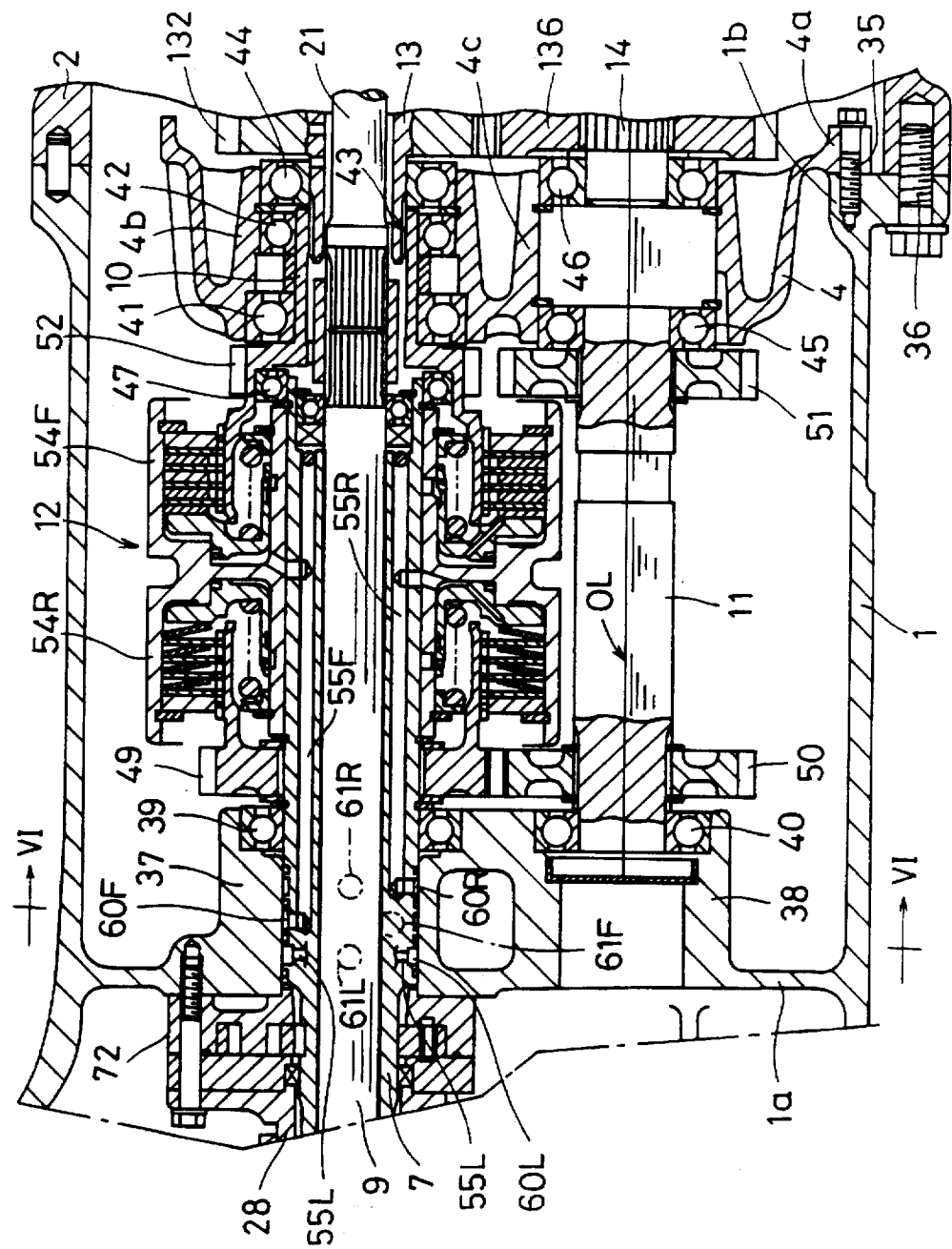
FIG. 3 is a sectional side view showing a rear half of the front housing.

As shown in FIG. 2, the power take-off clutch 8 comprises a thrust ring 8a secured to an engine flywheel 5a, a pressure plate 8b, and a diaphragm spring 8c which is secured to the primary shaft 9 and is interposed between the thrust ring 8a and pressure plate 8b. This cldutch 8 is engaged by displacing the pressure plate 8b rearwards to thereby engage the diaphrgm spring 8c frictionally with the thrust ring 8a. The cushion spring mechanism 6 for connecting the primary shaft 7 to the engine comprises a cover member 6a, which is secured to the thrust ring 8a so as to be driven by the engine flywheel 5a, and diaphragm springs 6b and torsion springs 6c for connecting between the cover member 6a and shaft 7. For operating the power take-off clutch 8, there are provided a slidable bearing assembly 29 mounted on a hollow support shaft 28 which is fixedly secured to the partition wall 1a, as shown in FIG. 3, and is disposed on the hollow primary shaft 7, one or more levers 30 which are rockingly displaced by the bearing assembly 29, and one or more pins 31 which are displaced axially by the levers 30 so as to displace the pressure plate 8b. The bearing assembly 29 is operated to slide by a york 33 which is fixedly mounted on a laterally extending clutch-operating rotatable shaft 32 which in turn is connected to a PTO-clutch lever (not shown) at an outside of the front housing 1.

Figure 4:
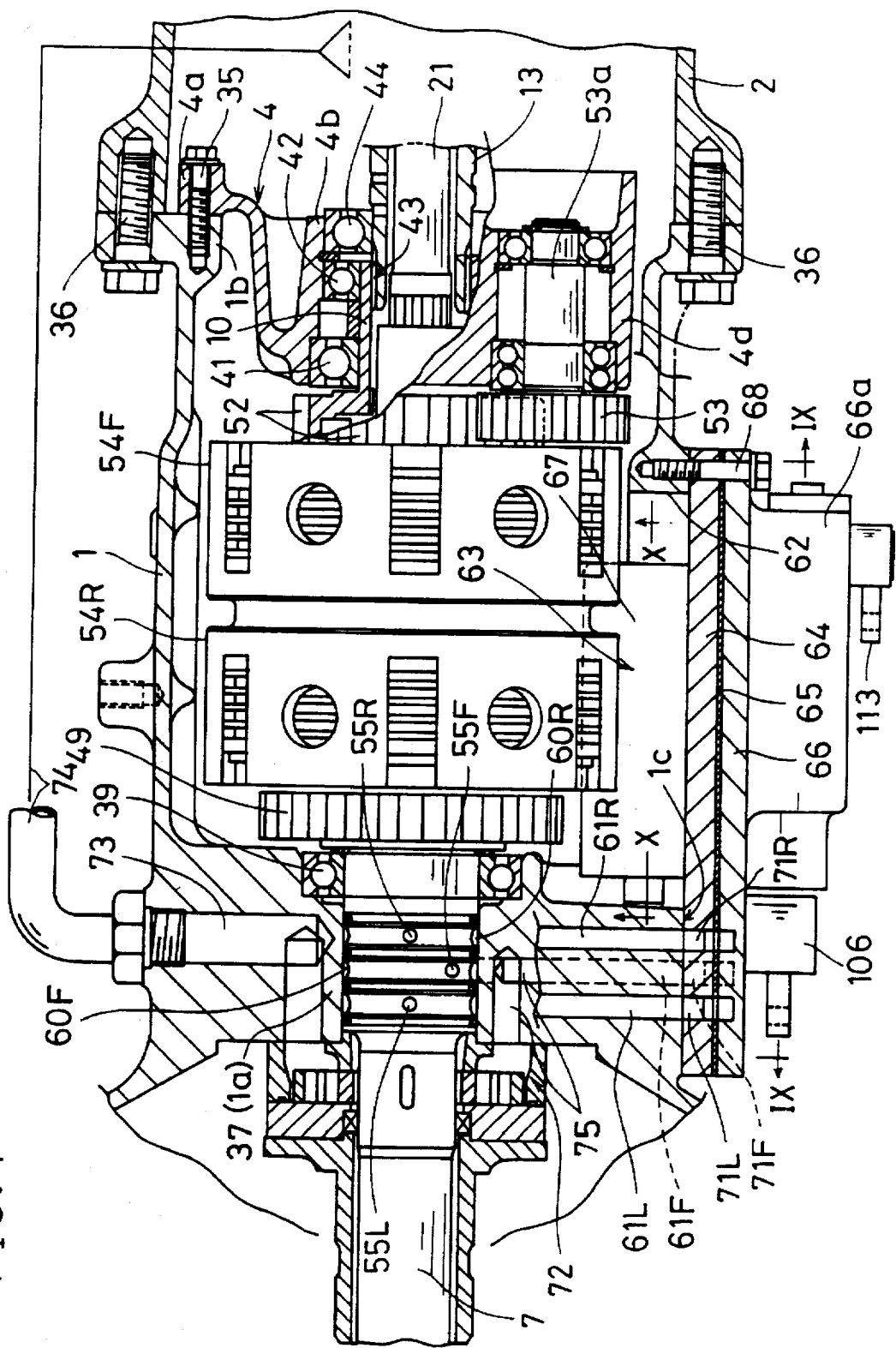
FIG. 4 is a sectional plane view showing the rear half of the front housing.

The additional speed change mechanism 12 will be detailed by referring to FIG. 3 and 4. The bearing support frame 4 is shaped such that this frame has at its rearmost outer periphery plural projections 4a which are adapted to abut from the side of transmission casing 2 against bosses 1b which are projected inwardly from the inner surface of a rear end portion of the front housing 1. Bolts 35 extend through projections 4a and are threadingly engaged with bosses 1b so as to secure the support frame 4 to the rear of the housing 1. The front housing 1 and transmission casing 2 are fastened together at their outer flanged portions using bolts 36 which are threadingly engaged with the casing 2 from the side of front housing 1.

As also shown in FIGS. 3 and 4, the primary shaft 7 is shaped such that it includes an outer diameter-enlarged rear half having its front end at an axial location nearly equal to that of the front surface of the partition wall 1a. A thickened hollow cylindrical portion 37 for receiving a front end portion of the diameter-enlarged rear half of primary shaft 7 is formed integrally in the partition wall 1a, and another thickened hollow cylindrical portion 38 which is integrally connected with the former cylindrical portion 37 is also formed in the partion wall 1a such that this portion 38 is faced to the intermediate shaft 11. The bearing support frame 4 is shaped such that it includes upper and lower hollow cylindrical support portions 4b and 4c and another hollow cylindrical support portion 4d of a mid level. An axially mid portion of the primary shaft 7 and a front end portion of the intermediate shaft 11 are supported respectively by the partition wall 1a through ball bearings 39 and 40 which are located respectively at rear end portions of the cylindrical portions 37 and 38. Output shaft 10 is supported by the upper cylindrical support portion 4b of support frame 4 through a pair of spaced ball bearings 41 and 42. A front end portion of the drive shaft 13 which is coupled to the output shaft 10 by a spline connection 43 is also supported by the cylindrical support portion 4b through a ball bearing 44. A rear end portion of the intermediate shaft 11 and a front end portion of the change shaft 14 are supported respectively by the lower cylindrical support portion 4c of support frame 4 through a ball bearing 45 and through a ball bearing 46. A rear end portion of the primary shaft 7 is supported by the output shaft 10 through a ball bearing 47 so that this end portion of shaft 7 is supported by the frame 4 through output shaft 10.

The additional speed change mechanism 12 includes a first gear 49 which is rotatably mounted on the primary shaft 7, a second gear 50 which is fixedly mounted on the intermediate shaft 11 and is meshed with the first gear 49, a third gear 51 which is fixedly mounted on the intermediate shaft 11, a fourth gear 52 which is formed integrally with the output shaft 10 at its foremost end, and an idler gear 53 which is supported at its integral shaft portion 53a by the cylindrical support portion 4d through ball bearings and is meshed with both of the third and fourth gears 51 and 52.

On the primary shaft 7, there are mounted a fluid-operated clutch 54R for coupling the first gear 49 selectively to the primary shaft 7 and another fluid-operated clutch 54F for coupling the fourth gear 52 selectively to the primary shaft. A clutch cylinder common to these clutches 54F and 54R is employed and is fixedly mounted on the primary shaft 7. A lower space within a rear half of the front housing 1 and a lower space within the transmission casing 2 are utilized as an oil sump in which lubricant oil having a level OL shown in FIG. 3 is contained. It is fashioned that the oil level OL is located approximately at the level of the center axis of the intermediate shaft 11 so that the clutch cylinder of clutches 54F and 54R is rotated without being immersed in the lubricant oil. As clearly shown in FIG. 5 which illustrates a part of FIG. 3 in an enlarged scale, boss portions of gears 49 and 52 include extentions 49a and 52a which extend respectively into the clutch cylinder. Each of the fluid-operated clutches 54F and 54R is fashioned to a frictional multi-disc type comprising alternately arranged frictional discs 54a and steel discs 54b which are slidably but non-rotatably supported respectively by each extension 49a, 52a and by the clutch cylinder. Each of the steel discs 54b is cone-shaped as shown with respect to clutch 54R. In an engaged condition of clutch, these steel discs 54b are flattened as shown with respect to clutch 54F. As is conventional, each of the clutches 54F and 54R includes a piston 54d which is biased to move toward a direction of disengaging the clutch by a return spring 54c. When clutch-operating fluid pressure is applied to the piston 54d, discs 54a and 54b are engaged frictionally whereby the clutch is engaged as shown with respect to clutch 54F. The additional speed change mechanism 12 shown is fashioned as a direction-reversing type in which the output shaft 10 is given a forward directional rotation when the clutch 54F is engaged so as to couple the fourth gear 52, and therefore output shaft 10, directly to the primary shaft 7, whereas the output shaft is given a backward directional rotation when the clutch 54R is engaged so as to couple the first gear 49 to the primary shaft 7 and to thereby connect the output shaft 10 to shaft 7 through gears 49, 50, 51, 53 and 52. Alternatively, the additional speed change mechanism may be fashioned as a high/low speed-selector type in which the idler gear 53 shown is omitted and the third and fourth gears 51 and 52 shown are meshed directly with each other.

Figure 5:
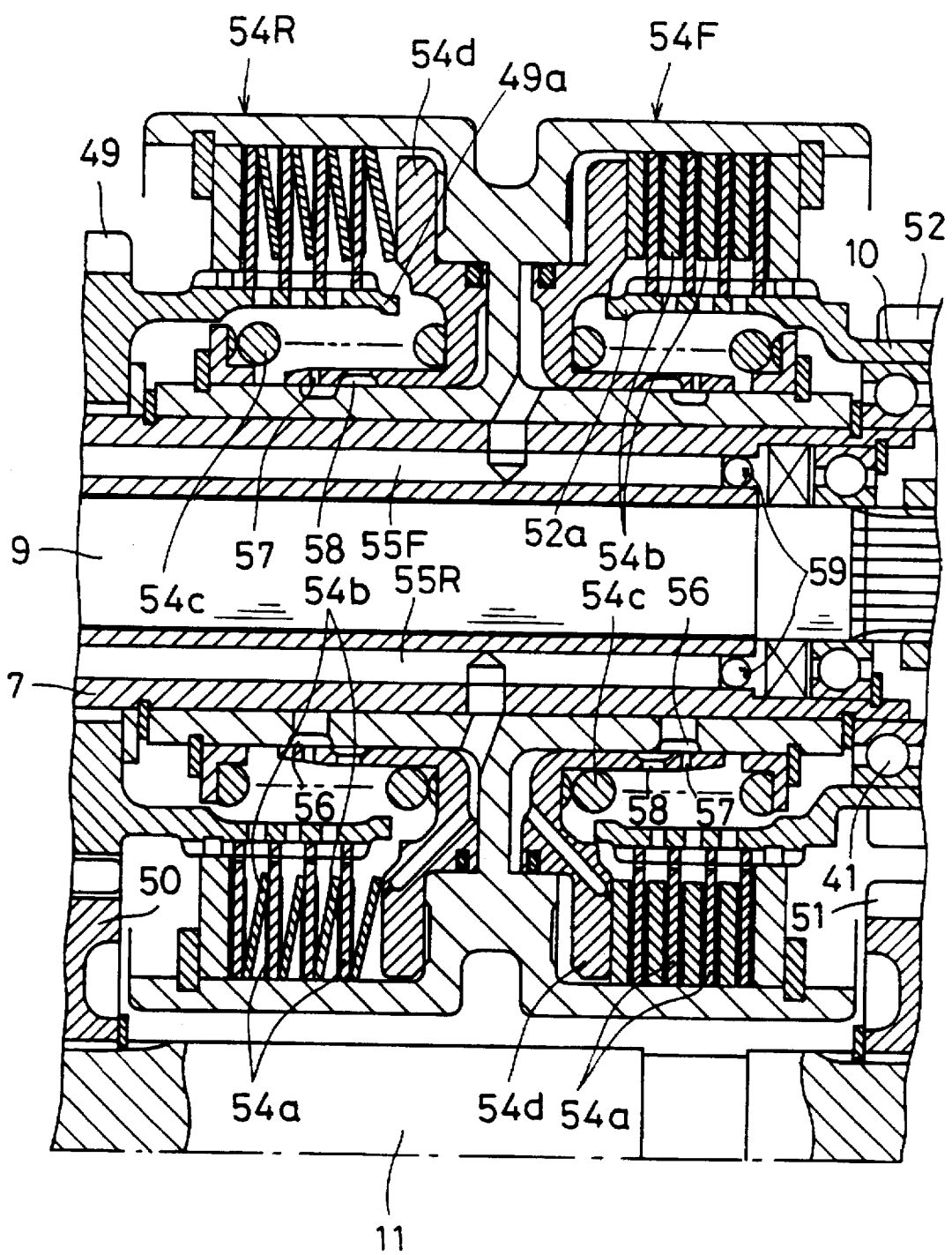
FIG. 5 is an enlarged view of a part of FIG. 3.
Figure 6:
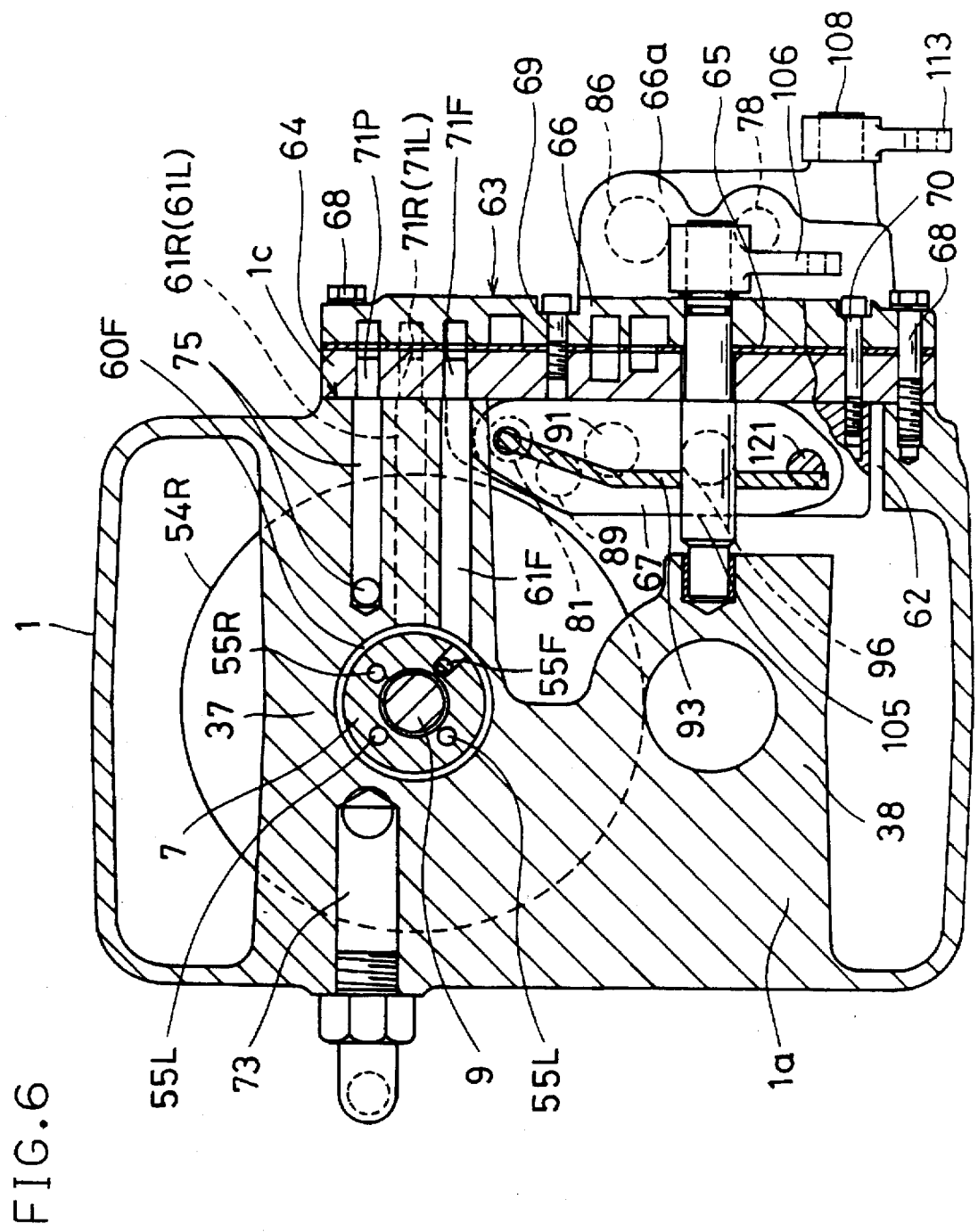
FIG. 6 is a sectional view taken generally along line VI—VI of FIG. 3.

For supplying operating fluid to the clutches 54F and 54R, clutch-operating fluid passages 55F and 55R are formed in the primary shaft 7, as shown in FIGS. 3 and 5, and are in communication with the clutches. As shown in FIGS. 3 and 6, the primary shaft 7 further includes in it two lubricant passages 55L for supplying lubricant oil to the discs 54a and 54b of clutches 54F and 54R. As shown in FIG. 5, each of these lubricant passages 55L is communicated with an annular groove 56, which is formed in a boss portion of the clutch cylinder. An orifice 57 and another passage bore 58 are formed in an inner cylindrical portion of each piston 54d for leading lubricant from the annular groove 56 toward the discs 54a and 54b. These orifice 57 and bore 58 are arranged such that the groove 56 is in communication only with the orifice 57 in a disengaged condition of the clutch as shown with respect to clutch 54R, whereas the groove 56 is in communication with both of the orifice 57 and bore 58 in an engaged condition of the clutch due to the displacement of piston 54d as shown with respect to clutch 54F. Fluid passages 55F, 55R and 55L in the primary shaft 7 are drilled from the rear end surface of this shaft 7 and rear ends of these passages are sealed, as shown in FIG. 5 with respect to passages 55F and 55R, using sealing balls 59.

As shown in FIGS. 3 and 4 and in FIG. 6, three annular fluid chambers 60F, 60R and 60L are formed between the primary shaft 7 and the hollow cylindrical portion 37 of partition wall 1a by sealing three annular grooves in the outer circumference of shaft 7 by means of the inner circumference of cylindrical portion 37. Clutch-operating fluid passages 55F and 55R in the primary shaft are communicated respectively with the annular fluid chambers 60F and 60R, and both of the lubricant passages 55L in the primary shaft is communicated with the annular chamber 60L. The partition wall 1a includes at its thickened portion adjacent to the cylindrical portion 37 laterally extending clutch-operating fluid passes 61F and 61R and lubricant passage 61L which open at their one ends respectively at the annular fluid chambers 60F, 60R and 60L.

Figure 7:
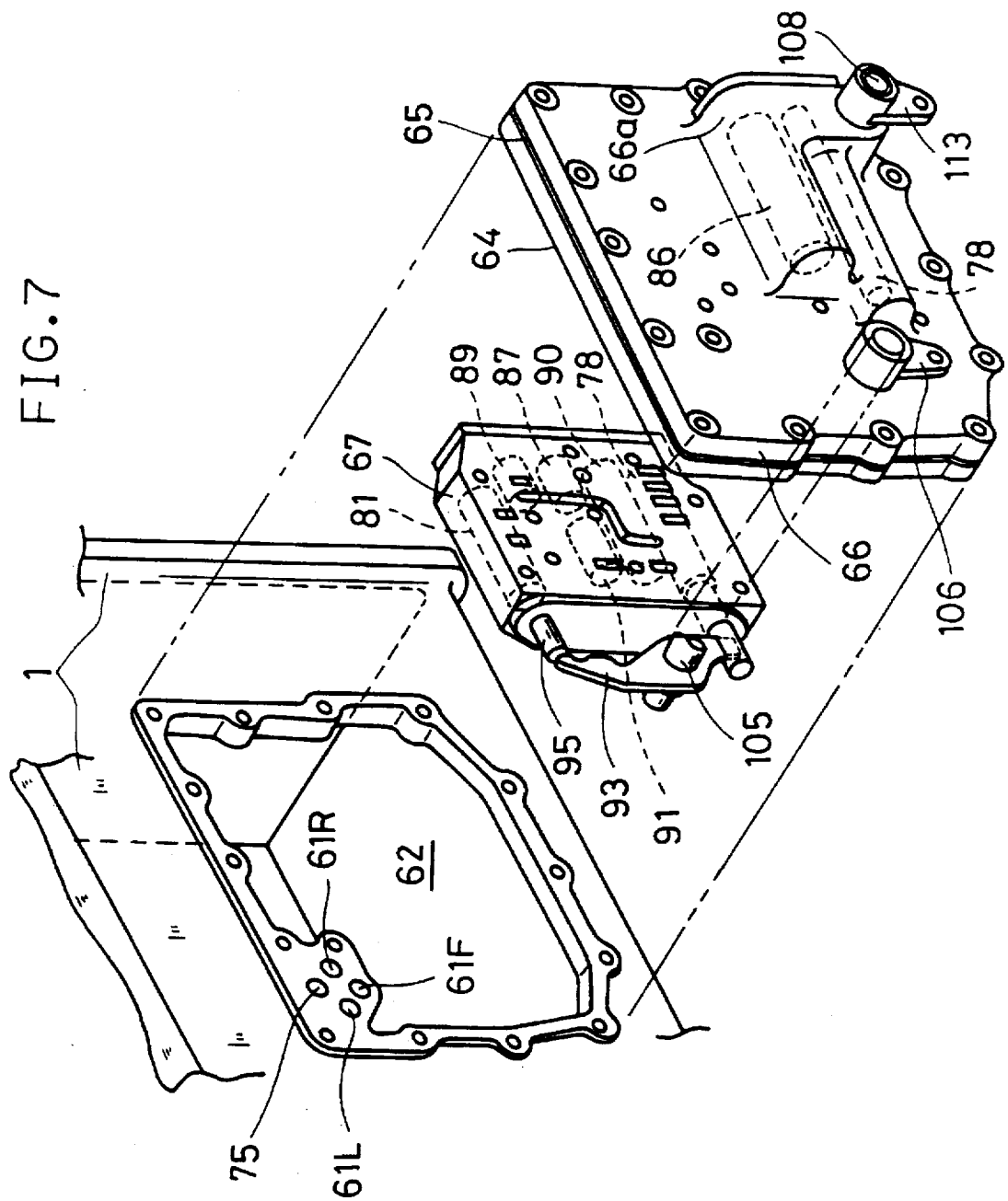
FIG. 7 is an exploded perspective view of a valve housing of a control valve assembly shown in FIGS. 4 and 6.

As shown in FIG. 4 and in FIGS. 6 and 7, a side wall of the front housing 1 includes at a location behind the partition wall 1a an opening 62. A control valve assembly 63 for controlling the operation of the additional speed change mechanism 12 extends through this opening 62 and is fixedly supported by the front housing 1. The valve assembly 63 comprises a valve housing composed of a plate member 64 which is disposed on an outer surface of the side wall set forth above, an outer housing member 66 which is disposed on an outer surface of the plate member 64 with a sealing sheet 65 therebetween, and an inner housing member 67 which is disposed on an inner surface of the plate member 64 and is located within the front housing 1. This valve housing is fixedly secured to the front housing using bolts 68. The plate member 64 and outer housing member 66 are fastened together using bolts 69, and bolts 70 are employed for fastening between these members 64 and 66 and the inner housing member 67.

As shown in FIGS. 4 and 6, the plate member 64 includes at its front end portion clutch-operating fluid ports 71F and 71R, lubricant port 71L and inlet or pump port 71P which open respectively at an outer surface 1c of the side wall portion adjacent to the partition wall 1a. Tile operating fluid passages 61F and 61R and lubricant passage 61L in the partition wall 1a are formed as straight passages which connect between the operating fluid ports 71F, 71R and lubricant port 71L in the plate member 64 and the annular fluid chambers 60F, 60R and 60L which are defined between the primary shaft 7 and hollow cylindrical portion 37, respectively. Fluid pump for supplying clutch-operating fluid to the clutches 54F and 54R is fashioned to an internal gear pump 72 by employing the primary shaft 7 as its pump shaft and is mounted on a front surface of the partition wall 1a. Inlet port of this fluid pump 72 is communicated with a suction passage 73 which is formed in the partition wall 1a and opens at an outer surface of the other side wall of the front housing 1, and a suction pipe 74 is employed, as schematically shown in FIG. 4, for connecting the suction passage 73 to the oil sump within the transmission casing 2. Outlet port of the fluid pump 72 is communicated to the inlet port 71P in the plate member 64 through a discharge passage 75 which is formed in the partition wall 1a.

Figure 8:
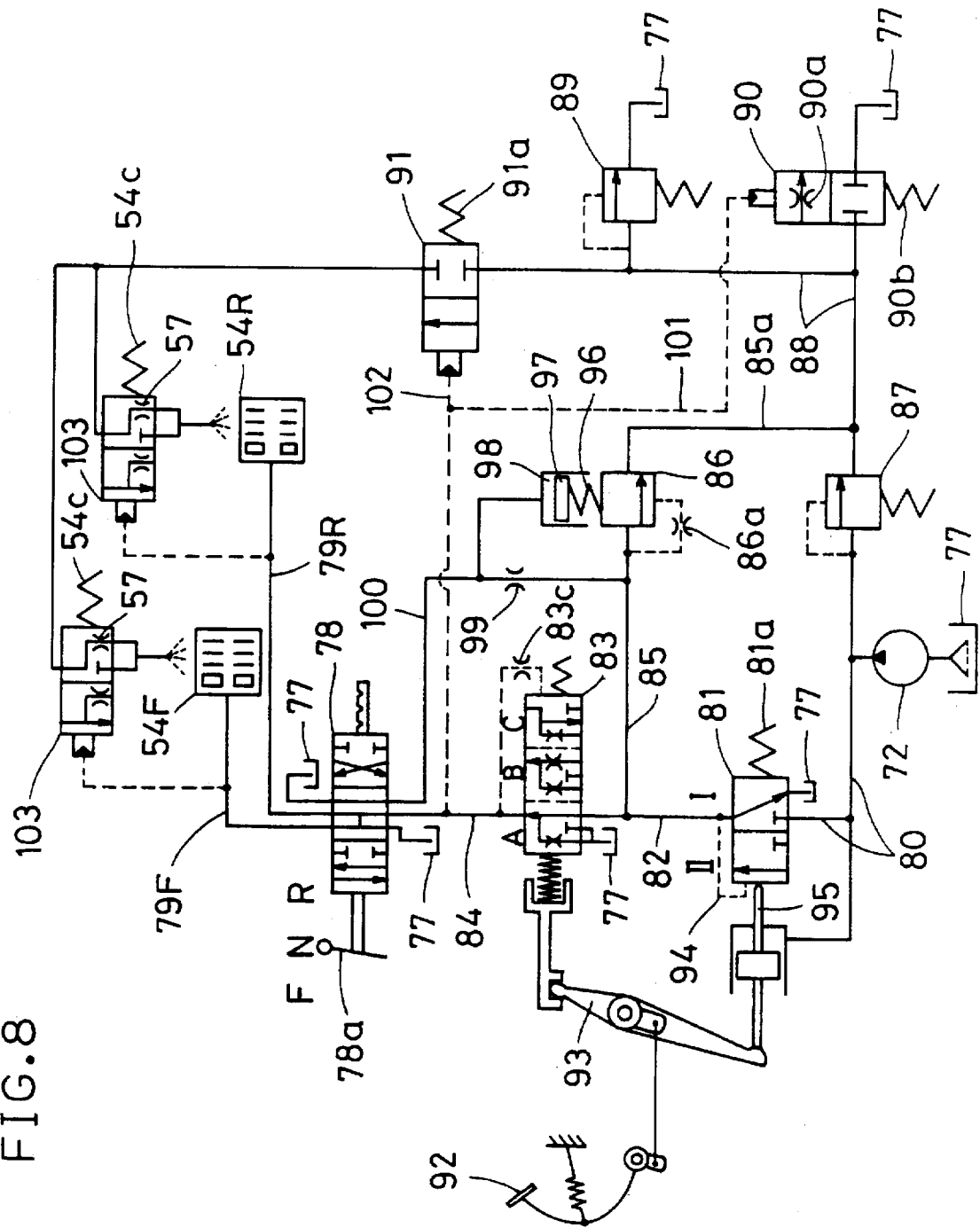
FIG. 8 is a circuit diagram showing a fluid system employed in the tractor.

The control valve assembly 63 will be outlined by referring to the fluid circuit diagram shown in FIG. 8. In this FIG. 8, the fluid reservior or oil sump within the rear half of front housing 1 and within the transmission casing 2 is shown as a tank designated by character 77. Valve assembly 63 includes a directional control valve 78 which is connected to the fluid-operated clutches 54F and 54R through fluid paths 79F and 79R which correspond respectively to the operating fluid passages 61F, 55F and 61R, 55R set forth above. This directional control valve 78 has a neutral position N in which both of the clutches 54F and 54R are disengaged, a forward directional position F in which clutch 54F is selectively operated, and a backward directional position R in which clutch 54R is selectively operated. To an output path 80 of the fluid pump 72 is connected a shut-off valve 81 which in turn is conneceted to a pressure-reducing valve 83 through a fluid path 82. Reducing valve 83 is connected to the directional control valve 78 through a fluid path 84. A fluid path 85 is branched from the path 82 and includes a modulating relief valve 86 for establishing fluid pressure to be applied to clutches 54F and 54R. A main relief valve 87 is provided for establishing fluid pressure in the pump-outlet path 80. Fluid-drain path 88 from this main relief valve 87 is directed toward clutches 54F and 54R and is used for supplying lubricant oil to the discs 54a and 54b of these clutches through fluid paths which correspond to the lubricant passages 61L and 55L set forth above. Fluid-drain path 85a from the modulating relief valve 86 is connected to the path 88. A secondary relief valve 89 is connected to the path 88 for establishing lubricant pressure. Further, a flow control valve 90 is connected to this path 88 and an on-off valve 91 is incorporated in this path 88.

As shown in FIG. 8, the pressure-reducing valve 83 is fashioned such that it is operated or displaced by a pedal 92 through a rockable arm 93. This reducing valve 83 has a non-reducing position A in which fluid path 82 is connected to fluid path 84 without any substantial reduction in fluid pressure, a pressure-reducing position B in which path connecting between the fluid paths 82 and 84 is throttled and a part of fluid is drained into sump 77 through an orifice so that fluid pressure established by the modulating relief valve 86 is variably reduced, and a pressure-unloading position C in which fluid path 82 is blocked and fluid path 84 is connected to sump 77 so that clutches 54F and 54R are disengaged. The shut-off valve 81 is fashioned to have a shut-off position 1 in which fluid path 80 is blocked and fluid path 82 is connected to sump 77, and an open position 11 in which fluid path 80 is connected to fluid path 82. This shut-off valve 81 is biased to move toward the shut-off position 1 by its valve spring 81a. A fluid pressure-applying path 94 is provided for applying fluid pressure in fluid path 82 to the shut-off valve 81 from the opposite side of valve spring 81a. It is fashioned that when the reducing valve 83 is displaced to its pressure-unloading position C the shut-off valve 81 is displaced from its shut-off position I to its open position II by a rod member 95 which is operated by the rockable arm 93 set forth above, and that this valve 81 is then kept in its open position II by fluid pressure in fluid path 82 which is applied through the path 94. Functions of these valves 81 and 83 will be fully detailed later.

As is usual, the modulating relief valve 86 includes a control piston 97 for receiving a base end of pressure-establishing spring 96. Behind this control piston is defined a fluid chamber 98 into which fluid pressure in the fluid path 82 is applied gradually through an orifice 99 so that piston 97 is gradually advanced so as to gradually highten the force of spring 96 whereby fluid pressure established in the fluid path 82 is gradually increased. For the purpose of draining fluid quickly from the fluid chamber 98 when the directional control valve 78 is returned to its neutral position N, chamber 98 is also connected to the control valve 78 through a fluid path 100 so that the chamber is connected to sump 77 through the valve 78.

As also shown in FIG. 8, the flow control valve 90 is fashioned to have a first position in which it does not allow fluid to be drained from path 88, and a second position in which a part of fluid flowing through path 88 is drained into sump 77 through an orifice 90a included in this valve 90. This flow control valve 90 is biased to move toward the first position by its valve spring 90b, and a pilot fluid path 101 is provided for applying fluid pressure in fluid path 84 between the reducing valve 83 and directional control valve 78 to the flow control valve 90 from the opposite side of spring 90b. The on-off valve 91 is fashioned to have an 'off' position shown in which it blocks path 88, and an 'on' position in which it allows lubricant oil to flow through path 88. Similarly to valve 90, the on-off valve 91 is biased to move toward the 'off' position by its valve spring 91a, and a pilot path 102 is provided for applying fluid pressure in fluid path 84 to this valve 91 from the opposite side of spring 91a. Consequently, these valves 90 and 91 operate to control supply of lubricant oil to clutches 54F and 54R in response to fluid pressure applied to the clutches, as will be fully detailed later.

In FIG. 8, the lubricant control mechanisms referred to above which are associated with respective clutches 54F and 54R are also illustrated as two valves 103 which include therein the above-referenced orifices 57 and each of which is biased by the above-referenced return spring 54c to move toward a position where lubricant is supplied only through orifice 57.

The structure of control valve assembly 63 will be detailed. As shown in FIGS. 6 and 7, the outer housing member 66 includes in its outer surface an integral housing portion 66a within which the modulating relief valve 86 and directional control valve 78 set forth above by referring to FIG. 8 are disposed such that these valves extend axially of the vehicle with the relief valve 86 being located at a higher level. As also shown in FIGS. 6 and 7, the shut-off valve 81, pressure-reducing valve 83, main relief valve 87, secondary relief valve 89, flow control valve 90 and on-off valve 91 also set forth above by referring to FIG. 8 are disposed within the inner housing member 67 such that these valves extend axially of the vehicle with the arrangement shown. The rockable arm 93 set forth above by referring to FIG. 8 is fixedly mounted on a laterally extending rotatable control shaft 105 which is rotatably supported by the outer housing member 66 and plate member 64 and by the partition wall 1a and is located before the inner housing member 67. This control shaft 105 carries at its outer end an operating arm 106. Plate member 64 is used generally for providing fluid passages. Fluid passages for connecting between fluid passages in the plate member 64 and fluid passages in the outer housing member 66 are formed in the sealing seat 65, whereas connection between fluid passages in the plate member 64 and fluid passages in the inner housing member 67 is attained by forming corresponding passages in these members in a face-to-face relationship.

Figure 9:
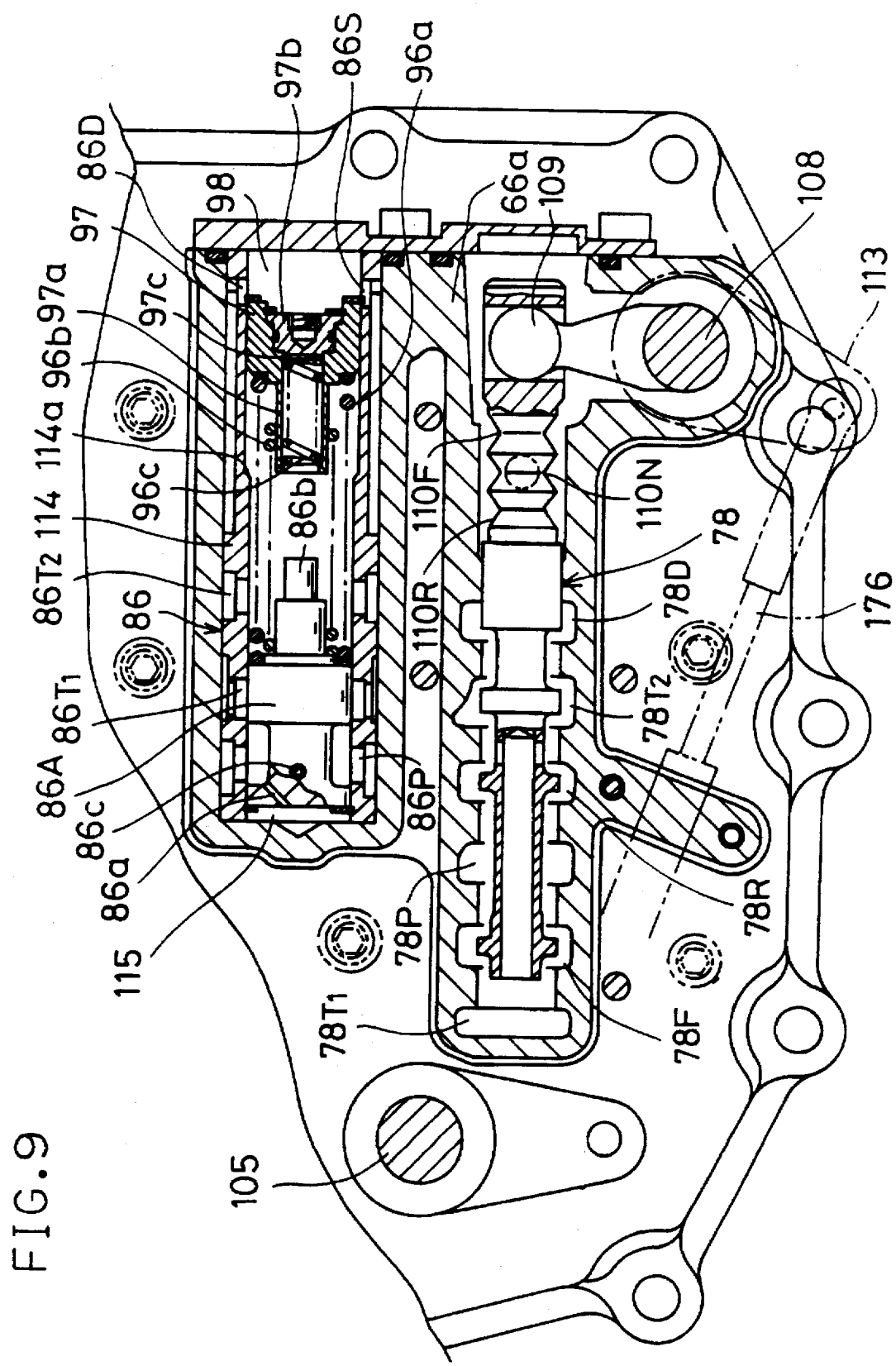
FIG. 9 is a sectional view taken generally along line IX—IX of FIG. 4.
Figure 10:
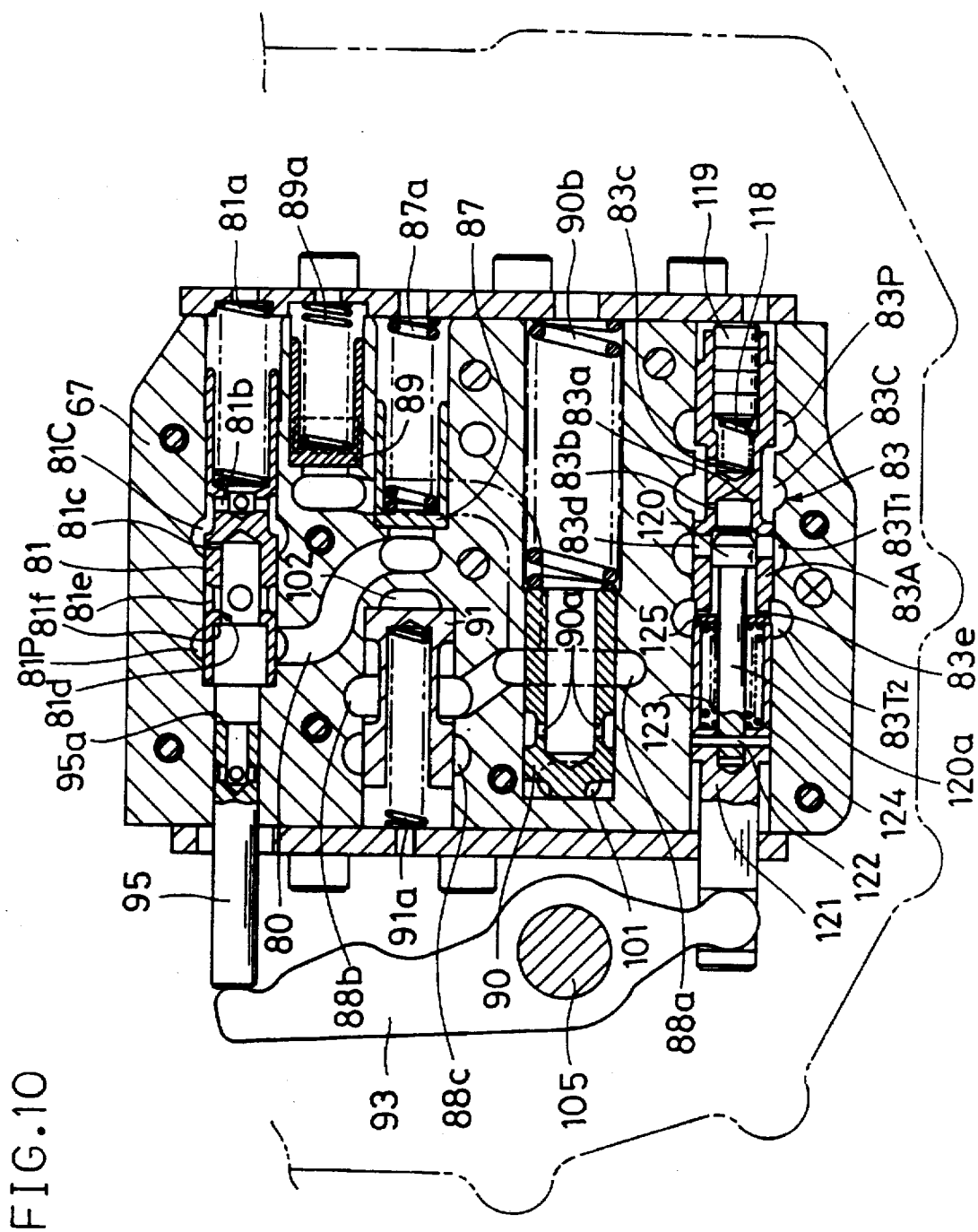
FIG. 10 is a sectional view taken generally along line X—X of FIG. 4.
Figure 11:
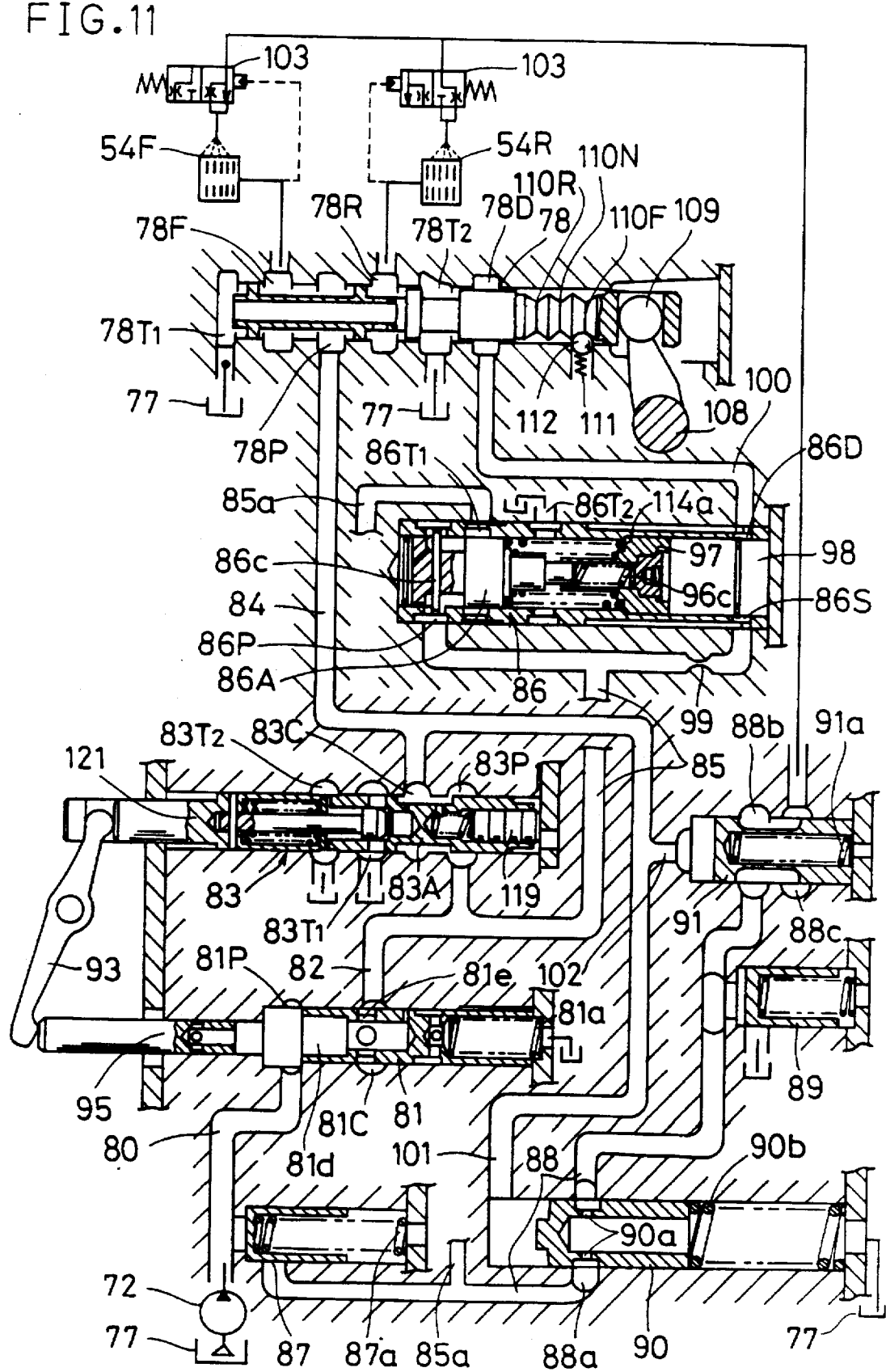
FIG. 11 is a schematic sectional view showing the connection and operation of various valves in the control valve assembly shown in FIGS. 9 and 10.

Valve structures in the outer housing member 66 are shown in FIGS. 9 and 11, whereas valve structures in the inner housing member 67 are shown in FIGS. 10 and 11.

As shown in FIGS. 9 and 11, the directional control valve 78 is composed of a spool which is slidably disposed within an axial valve-receiving bore formed in the housing portion 66a. At the valve-receiving bore, there open respectively a pump port 78P to which fluid path 84 from the pressure-reducing valve 83 is connected, clutch ports 78F and 78R which are connected respectively to the fluid-operated clutches 54F and 54R, two fluid drain ports $78T_1$ and $78T_2$ which are connected respectively to oil sump 77, and a fluid return port 78D to which fluid path 100 from the fluid chamber 98 in the modulating relief valve 86 is connected. Valve 78 includes lands and internal fluid passage which are operable to connect and disconnect between the ports set forth above. It is fashioned that directional control valve 78 is operable at its neutral position N shown in FIG. 9 to connect all of the pump port 78P, clutch ports 78F and 78R, and fluid return port 78D to the fluid drain port $78T_1$ or $78T_2$. It is further fashioned that this valve 78 is operable at its forward directional position F shown in FIG. 11 to connect pump port 78P to clutch port 78F while to connect clutch port 78R to fluid drain port $78T_1$ and to block fluid return port 78D, whereas valve 78 is operable at its backward directional position R, to which it is displaced by being displaced rearwards from the neutral position shown in FIG. 9, to connect pump port 78P to clutch port 78R while to connect clutch port 78F to fluid drain port $78T_1$ and to block fluid return port 78D.

For operating or displacing directional control valve 72, a laterally extending control shaft 108 is rotatably supported by the housing portion 66a and carries a shifter 109 which engages valve 78. For retaining the valve 78 releasably at each of the positions N, F and R, the valve spool has in its outer circumference three annular latching grooves 110N, 110F and 110R into which a latching ball 112 disposed within a bore in the housing portion 66a projects selectively under the biasing of spring 111. As shown, no circular outer surface portions are formed between respective two adjacent grooves 110N and 110F and 110N and 110R for preventing ball 112 from engaging such circular surface portions so as to retain the valve spool at improper positions. As shown in FIGS. 6 and 7, control shaft 108 extends outwardly of the housing portion 66a and has at its outer end an operating arm 113 attached thereto.

As shown in FIGS. 9 and 11, the modulating relief valve 86 comprises a valve body 86A and control piston 97 which are disposed within a valve casing 114 which in turn is fittingly inserted in an axial bore formed in the housing portion 66a. Valve casing 114 includes a pump port 86P to which fluid path 85 is connected, a fluid pressure-applying port 86S which is connected to fluid path 85 through the above-referenced orifice 99 formed in the housing portion 66a and which opens at the above-referenced fluid chamber 98, a fluid relief port $86T_1$ which is connected to fluid path 85a, a fluid drain port $86T_2$ which is connected to sump 77, and a fluid return port 86D which is connected to fluid path 100. Valve body 86A includes in it a throttled fluid passage 86a for leading fluid pressure in the pump port 86P to a fluid chamber 115 which is defined within the casing 114 at the opposite side of control piston 97. Valve body 86A further has an integral pin-shaped portion 86b which extends toward the control piston 97. Control piston 97 has at its front face an integral tubular portion 97a into which the pin-shaped portion 86b can project. Fluid pressure-establishing spring 96 set forth above by referring to FIG. 8 is composed of three co-axial coil springs 96a, 96b and 96c. Of these springs, the outermost spring 96a is arranged such that it engages at its one and the other ends both of the valve body 86A and control piston 97 already at the condition shown in FIG. 9 where these valve body and control piston are spaced from each other to the maximum extent. The radially intermediate spring 96b is arranged such that one end of it engages valve body 86A and the other end is guided by the tubular portion 97a and is spaced from control piston 97 by some interval at the condition shown in FIG. 9. The innermost spring 96c is disposed within the tubular portion 97a such that it becomes engaged with the pin-shaped portion 86b when this portion 86b has projected into the tubular portion 97a due to an advance movement of the control piston 97 as shown in FIG. 11. Base end of this spring 96c is received by a removable plug 97b which is threadingly engaged with control piston 97, and it is fashioned that a shim or shims 97c can be disposed between spring 96c and plug 97b for adjusting the force of spring 96c. Valve casing 114 includes at it inner circumference an annular step 114a for limiting the advance movement of cotrol piston 97. A stop pin 86c is attached to the valve body 86A for preventing this body from causing an overlift action of moving excessively due to a high viscosity of oil when the oil temperature is low.

Figure 12:
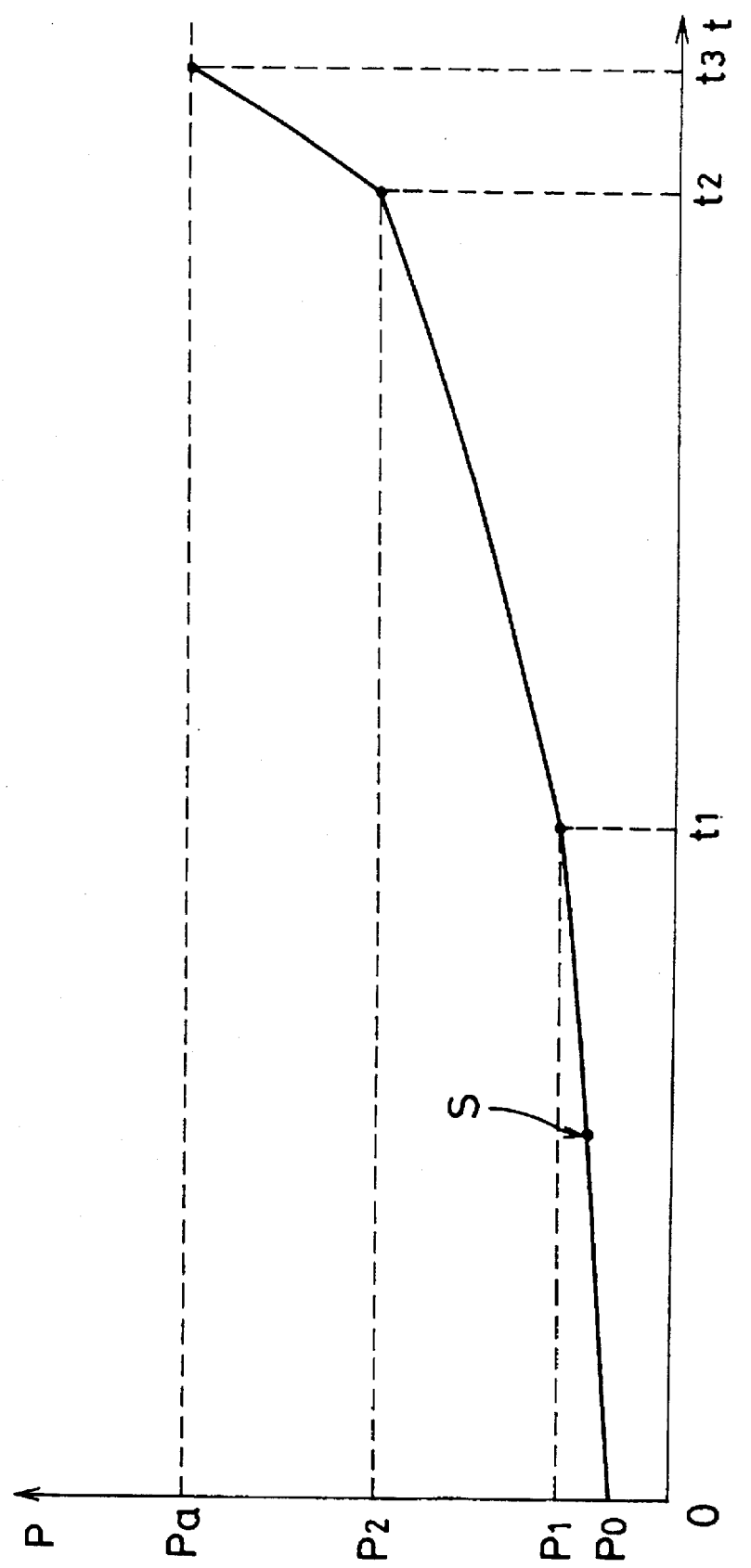
FIG. 12 is a schematic graph showing the operation of a modulating relief valve shown in FIGS. 9 and 11.

The preferred modulating relief valve 86 having been detailed above varies the mode of increasing fluid pressure, as from the time when the directional control valve 78 has been displaced from its neutral position N to the forward or backward directional position F or R, in three stages owing to the employment of three springs 96a, 96b and 96c which are arranged in the manner detailed above. FIG. 12 illustrates such mode of increasing fluid pressure P as a function of time t. At the time when the control valve 78 has just been displaced (t=0), a low initial fluid pressure $P_0$ is established which corresponds to the initial spring force or load of the outermost spring 96a. As the control piston 97 is gradually advanced by fluid supplied gradually into the fluid chamber 98 so that the force of spring 96a is gradually hightened, fluid pressure P is gradually increased from the initial pressure $P_0$ to pressure $P_1$ at the time $t_1$ at which the radially intermediate spring 96b becomes in engagement with the control piston 97 due to the advance of this piston. As from the time $t_1$, springs 96a and 96b are concerned with the increase in fluid pressure P so that fluid pressure P is increased at a higher rate than before from the pressure $P_1$ to pressure $P_2$ at the time $t_2$ at which the pin-shaped portion 86b of valve body 86A has just projected into the tubular portion 97a of control piston 97 and has just become in engagement with the innermost spring 96c. As from the time $t_2$, spring 96c is also concerned with the increase in fluid pressure so that fluid pressure P is increased relatively rapidly from the pressure $P_2$ to a normal pressure Pa at the time $t_3$ at which the conrol piston 97 becomes in engagement with the annular step 114a of valve casing 114 as shown in FIG. 11. Start of the vehicle is attained, for example, at an intermediate point S between the times $t_1$ and $t_2$ and, thereafter, the vehicle becomes placed gradually in its normal operation without any substantial shock owing to the gradual increase in fluid pressure. Because spring 96c participating in the establishment of normal fluid pressure is disposed within the inside of control piston 97, normal fluid pressure Pa can be varied or adjusted easily by means of, for example, the above-referenced shims 97c. Such an adjustment of the normal fluid pressure will not provide any unfavorable influence on the initial fluid pressure $P_0$ and on the fluid pressure-increasing characteristics until the time $t_2$. The employment and arrangement of springs 96a, 96b and 96c will prolong the delay time in inceasing fluid pressure so that, even under the condition where the primary and auxiliary speed change mechanisms 15 and 18, shown in FIG. 1, within the transmission casing 2 are placed in their high speed change ratios, shock caused during the start of vehicle will be largely reduced.

The structure of pressure-reducing valve 83 will be detailed by referring to FIGS. 10 and 11 and to FIGS. 13 to 16. As shown in FIGS. 10 and 11, this valve 83 comprises a valve body 83A which is slidably disposed within an axial valve-receiving bore formed in the inner housing member 67 at a lower portion thereof. At the valve-receiving bore, there open respectively a pump port 83P to which fluid path 82 from the shut-off valve 81 is connected, a clutch port 83C which is connected to fluid path 84 directed toward the directional control valve 78, and two fluid drain ports $83T_1$ and $83T_2$ which are connected respectively to sump 77. Valve body 83A is shaped hollow and includes at an axial mid portion thereof an internal partition wall 83a. Spring 118 and load piston 119 are disposed within the valve body and behind the partition wall 83a, while a poppet 120 is disposed within the valve body and before the partition wall 83a. Poppet 120 has a stem 120a which is secured to a control rod 121, using a pin 122, which in turn is slidably inserted into a front end portion of the valve-receiving bore and is engaged at a location before the housing member 67 with the above-referenced rockable arm 93. Control rod 121 includes in its rear half an axial bore within which a pair of coil springs 123 and 124 are disposed and are adapted to bias the valve body 83A to move rearwards through a ring 125. Valve body 83A further includes a pair of radial orifices 83b and 83c which are located respectively before and behind the internal partition wall 83a, a radial bore 83d for communicating the hollow space within the valve body 83A to the fluid drain port $83T_1$, and a radial orifice 83e which is formed in the front face of valve body 83A abutting against the ring 125 and opens at the fluid drain port $83T_2$.

Figure 13:
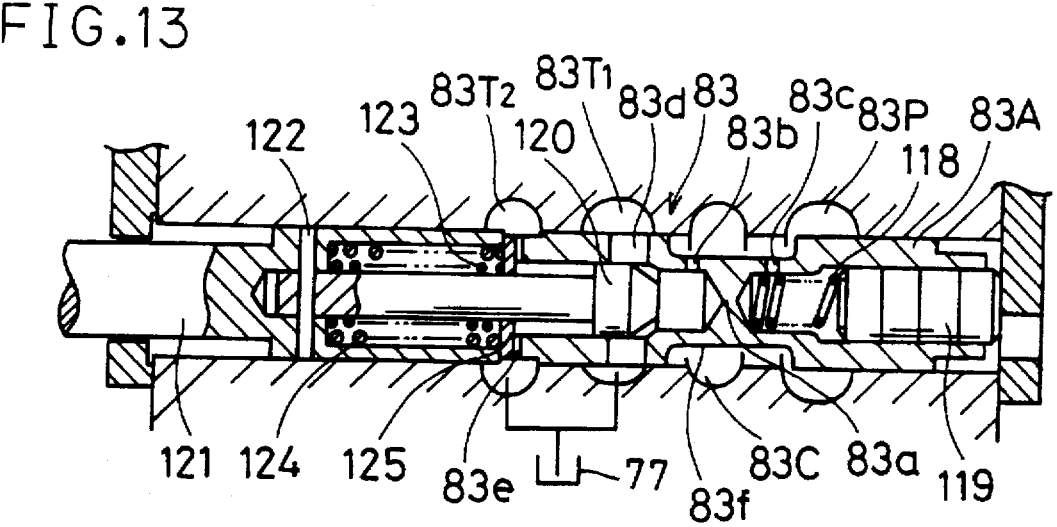
FIG. 13 is an enlarged sectional view of a pressure-reducing valve shown in FIGS. 10 and 11.
Figure 14:
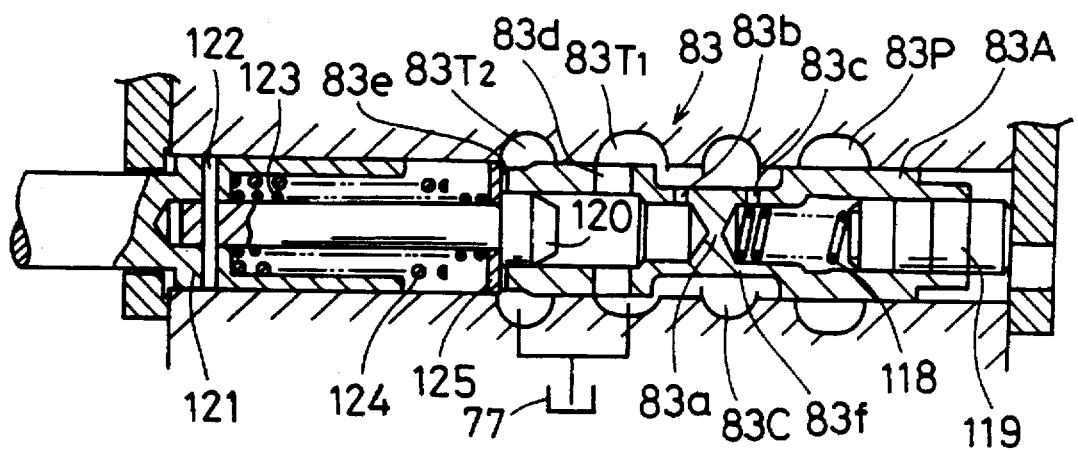
FIG. 14 is a sectional view similar to FIG. 13 but showing the reducing valve in its pressure-unloading position.

Pressure-reducing valve 83 is adapted to be displaced by providing a sliding movement to the control rod 121 by means of rockable arm 93. For attaining the non-reducing position A and pressure-unloading position C set forth before by referring to FIG. 8, valve 83 is fashioned in such a way that will be detailed hereinafter. FIGS. 11 and 13 illustrate the reducing valve 83 at its non-reducing position A. As clearly shown in FIG. 13, it is fashioned that, in the non-reducing position A, an axially mid diameter-reduced portion 83f of the valve body 83A permits an unrestricted fluid communication between ports 83P and 83C so that fluid pressure in the pump port 83P is transmitted to the clutch port 83C as an output fluid pressure without being reduced. FIG. 14 illustrates the reducing valve 83 at its pressure-unloading position C which is attained by treading down the pedal 92 shown in FIG. 8 fully so as to displace the control rod 121 fowards fully. In this unloading position, control rod 121 takes a position of reducing the biasing force of springs 123 and 124 largely so that valve body 83A is displaced by the biasing force of spring 118 to the position shown where, while the pump port 83P is blocked by a land arranged behind the diameter-reduced portion 83f, the portion 83f permits a full communication of the clutch port 83C to the fluid drain port $83T_1$ whereby fluid pressure in the clutch port 83C is unloaded.

Figure 15:
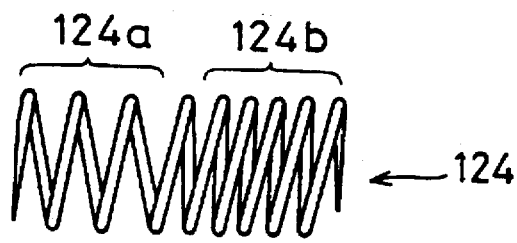
FIG. 15 is a side view of a coil spring employed in the reducing valve shown in FIGS. 13 and 14.
Figure 16A:
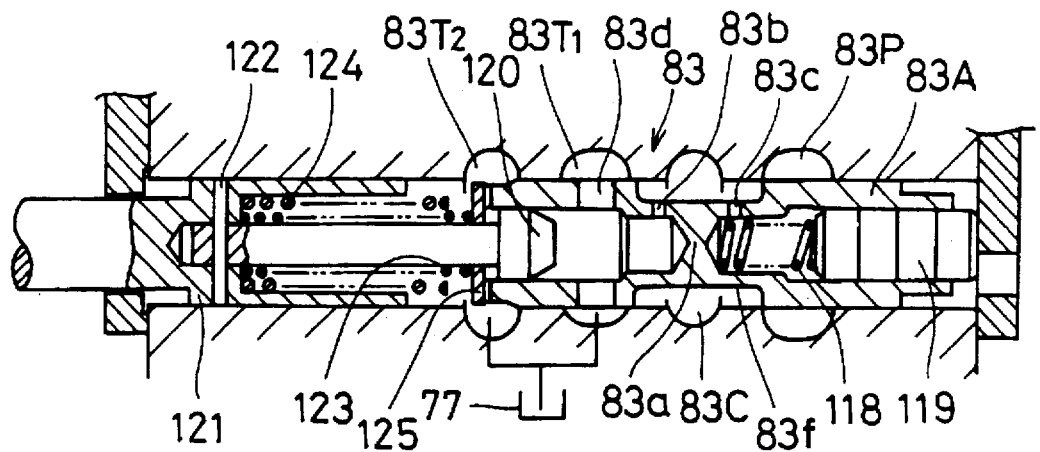
FIGS. 16a, 16b and 16c are sectional views showing the operation of the reducing valve shown in FIGS. 13 and 14.
Figure 16B:
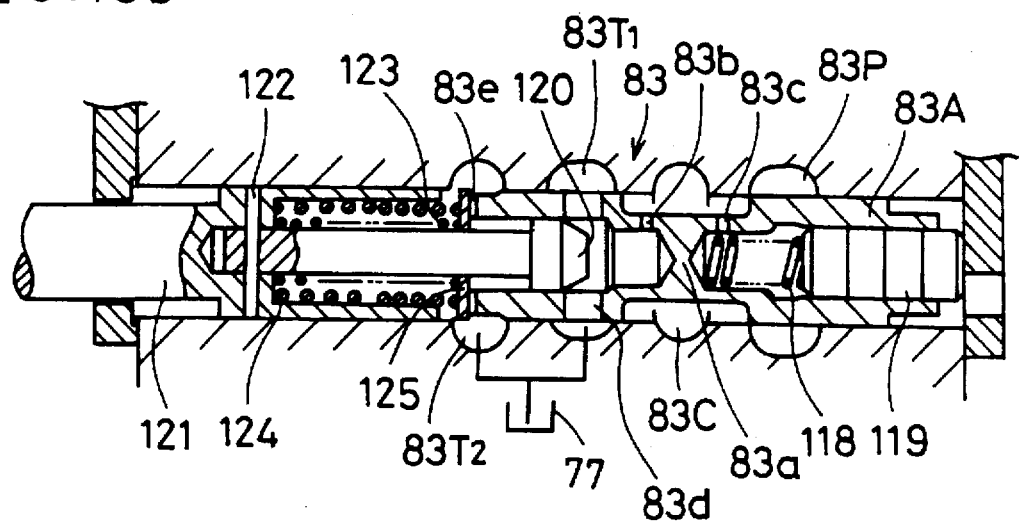
Figure 16C:
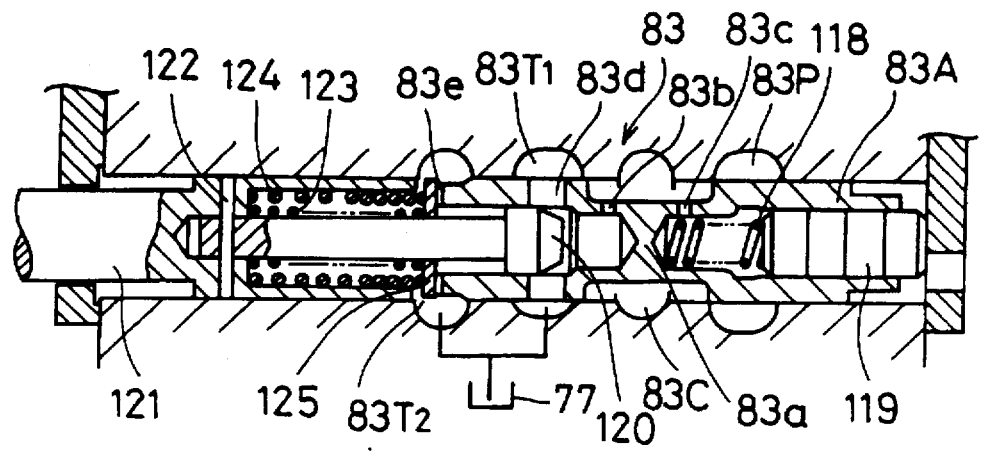

As can be seen from FIG. 14, outer spring 124 of the pair of coil springs 123 and 124 is arranged such that this spring 124 becomes away from the ring 125 in a condition where the control rod 121 is displaced forwards by more than a certain distance. As shown in FIG. 15, this outer coil spring 124 is particularly fashioned such that it comprises a thinly coiled portion 124a of larger rigidity and a densely coiled portion 124b of smaller rigidity so that, when the spring 124 is compressed between the control rod 121 and ring 125 by being pushed by the rod 121, the densely coiled portion 124b is compressed first to cause close contact of coils in this portion 124b and then the thinly coiled portion 124a is compressed. FIGS. 16a, 16b and 16c illustrate three pressure-reducing modes afforded by valve 83 in its pressure-reducing position B set forth before by referring to FIG. 8. In each of these modes, the valve body 83A is biased to move forwards by fluid pressure in the clutch port 83C applied through orifice 83c and by the biasing force of spring 118 and is biased to move rearwards by the biasing force of spring 123 or springs 123 and 124. Further, fluid in the clutch port 83C is drained continuously to the fluid drain port $83T_1$ at a small rate through the orifice 83b. Due to this, valve body 83A is oscillatingly moved back and forth so as to open and close the pump port 83P by an end portion of the land arranged behind the diameter-reduced portion 83f and to thereby transmit fluid pressure in the pump port to the clutch port 83C as a reduced output pressure. FIG. 16a illustrates a state where the control rod 121 is displaced forwards relatively largely so that the outer spring 124 is away from the ring 125. In this state, the pressure-reducing degree is determined exclusively by the biasing force of inner spring 123 so that a largely reduced pressure is obtained at the clutch port 83C as the output fluid pressure of reducing valve 83. FIG. 16b illustrates a state where the control rod 121 is located at a position such that both of the inner and outer springs 123 and 124 are in engagement with the ring 125 but the outer spring is compressed only at its densely coiled portion 124b (FIG. 15). In this state, the pressure-reducing degree is determined by the biasing force of inner spring 123 and by the biasing force of the densely coiled portion 124b of outer spring 124 so that a reduced pressure of middle level is obtained at the clutch port 83C as the output fluid pressure of reducing valve 83. FIG. 16c illustrates a state where the control rod 121 is located at a position such that coils in the densely coiled portion 24b of outer spring 124 are in close contact with one another and the thinly coiled portion 124a of this spring is subjected to compression. In this state, the thinly coiled portion 124a is also concerned with determination of the pressure-reducing degree so that a reduced pressure of lower level is obtained as the output fluid pressure of reducing valve 83. Full operation of the pressure-reducing valve 83 will be detailed later.

Structure of the shut-off valve 81 will be detailed by referring to FIGS. 10 and 11. This valve 81 is disposed within an axial valve-receiving bore formed in the inner housing member 67 at an upper portion thereof. There open at this bore a pump port 81P to which fluid path 80 from the pump 72 is connected, and a clutch port 81C which is connected to fluid path 82 directed toward the pressure-reducing valve 83. Valve 81 is biased by its valve spring 81a to move toward a direction of blocking between the ports 81P and 81C. Valve 81 includes a radial bore 81b for draining fluid from the clutch port 81C to sump 77 at the shut-off position I set forth before by referring to FIG. 8, and a radial orifice 81c for applying fluid pressure in the clutch port 81C to this valve 81 from the opposite side of valve spring 81a. The fluid path 94 set forth before by referring to FIG. 8 is made common to a primary fluid passage in the shut-off valve 81 and is provided by a hollow space 81d within the valve 81 and by a radial bore 81e communicating with the space 81d. The rod member 95 also set forth before by referring to FIG. 8 is slidably inserted into a diameter-reduced bore arranged before the valve-receiving bore and has a rear end face 95a which is operable to push an internal annular step 81f of the valve 81 so as to move this valve rearwards against the biasing force of valve spring 81a.

As already described, when pressure-reducing valve 83 is displaced to its pressure-unloading position C shown in FIG. 8 shut-off valve 81 is pushed by the rod member 95 and is displaced to its open position II shown in FIG. 11 where ports 81P and 81C are communicated to each other through the hollow space 81d and bore 81e. FIG. 11 illustrates a state in which the reducing valve 83 is then returned to its non-reducing position A and, as a result of this, the rod member 95 is displaced by the action of fluid pressure in the hollow space 81d outwards so as to keep engagement with the rockable arm 93. In this state, shut-off valve 81 remains in its open position II due to the fluid pressure in path 82 which is applied through bore 81e. As described before with respect to FIGS. 1 and 2, the primary shaft 7 is adapted to be driven directly by engine 5 without a clutch therebetween. This is because the shut-off valve 81 set forth above is provided, so that the additional change mechanism 12 shown in FIGS. 1 and 3 is operable as a clutch for the vehicle drive-power transmission line. That is, the shut-off valve 81 remains in its shut-off position shown in FIG. 10, even when the directional control valve 78 is displaced to its foward or backward directional position F or R, and is firstly displaced to its open position when pedal 92 shown in FIG. 8 is trodden down fully so that the pressure-reducing valve 83 is displaced to its pressure-unloading position C. And the fluid-operated clutch 54F or 54R is not engaged at the unloading position C of reducing valve 83 due to the unloading of fluid pressure so that the additional speed change mechanism 12 shown in FIGS. 1 and 3 functions as a clutch. The change mechanism 12 then starts transmitting power gradually as the pedal 92 is gradually released.

Of the other valves disposed within the inner housing member 67, the main relief valve 87 is arranged such that it faces to fluid path 80 at a junction between fluid paths 80 and 88 and is biased by its valve spring 87a to move to its non-relief position, as shown in FIGS. 10 and 11. As also shown in FIGS. 10 and 11, the secondary relief 89 is arranged such that it faces to fluid path 88 and is biased by its valve spring 89a to move to its non-relief position. The flow control valve 90 is disposed within an axial valve-receiving bore at which an annularly grooved portion 88a in the fluid path 88 opens. The orifice 90a set forth before is provided by a throttled radial bore formed in the valve 90. The pilot path 101 also set forth before is arranged so that fluid pressure in this path is applied to a front end face of valve 90. The flow control valve 90 is operable, when it is displaced by the action of fluid pressure in the path 101 against its valve spring 90b to the position shown in FIG. 11, to drain a portion of fluid from path 88 into sump 77 through the orifice 90a and to thereby reduce flow of fluid in the path 88. The on-off valve 91 is disposed within an axial valve-receiving bore at which a pair of spaced annularly grooved portions 88b and 88c in the path 88 open. The pilot path 102 set forth before is arranged such that fluid pressure in this path is applied to an end face of valve 91. The on-off valve 91 is operable, when it is displaced by the action of fluid pressure in the path 102 against its valve spring 91a to the position shown in FIG. 11, to permit fluid communication between the grooved portions 88b and 88c by its diameter-reduced portion shown and to thereby permit flow of lubricant toward the clutches 54F and 54R.

FIG. 11 having been referred to hereinbefore illustrates a state in which the vehicle is traveled under a normal condition in the forward directional position F of directional control valve 78. Pressure-reducing valve 83 is placed in its non-reducing position A. In this state, the modulating relief valve 86 takes the state shown and the normal fluid pressure Pa shown in FIG. 12 is established in fluid paths 82 and 84, and due to this fluid pressure, the flow control valve 90 operates to drain a portion of fluid from lubricant supply path 88 while the on-off valve 91 operates to permit lubricant flow through this path 88. The secondary relief valve 89 takes its fluid relief position shown and establishes or determines fluid pressure of lubricant supplied toward clutches 54F and 54R. Because fluid pressure of clutch-operating fluid is now determined by the modulating relief valve 86, the main relief valve 87 remains in its non-relief position and fluid relieved from the pump port 86P to drain port 86T₁ of the modulating relief valve 86 is supplied to lubricant-supply path 88 through fluid path 85a as lubricant.

Of the lubricant control mechanisms associated with clutches 54F and 54R which are illustrated as two valves 103 similarly in the case of FIG. 8, only the valve 103 associated with the forward directional clutch 54F takes the position shown where lubricant is supplied without being restricted.

Figure 17:
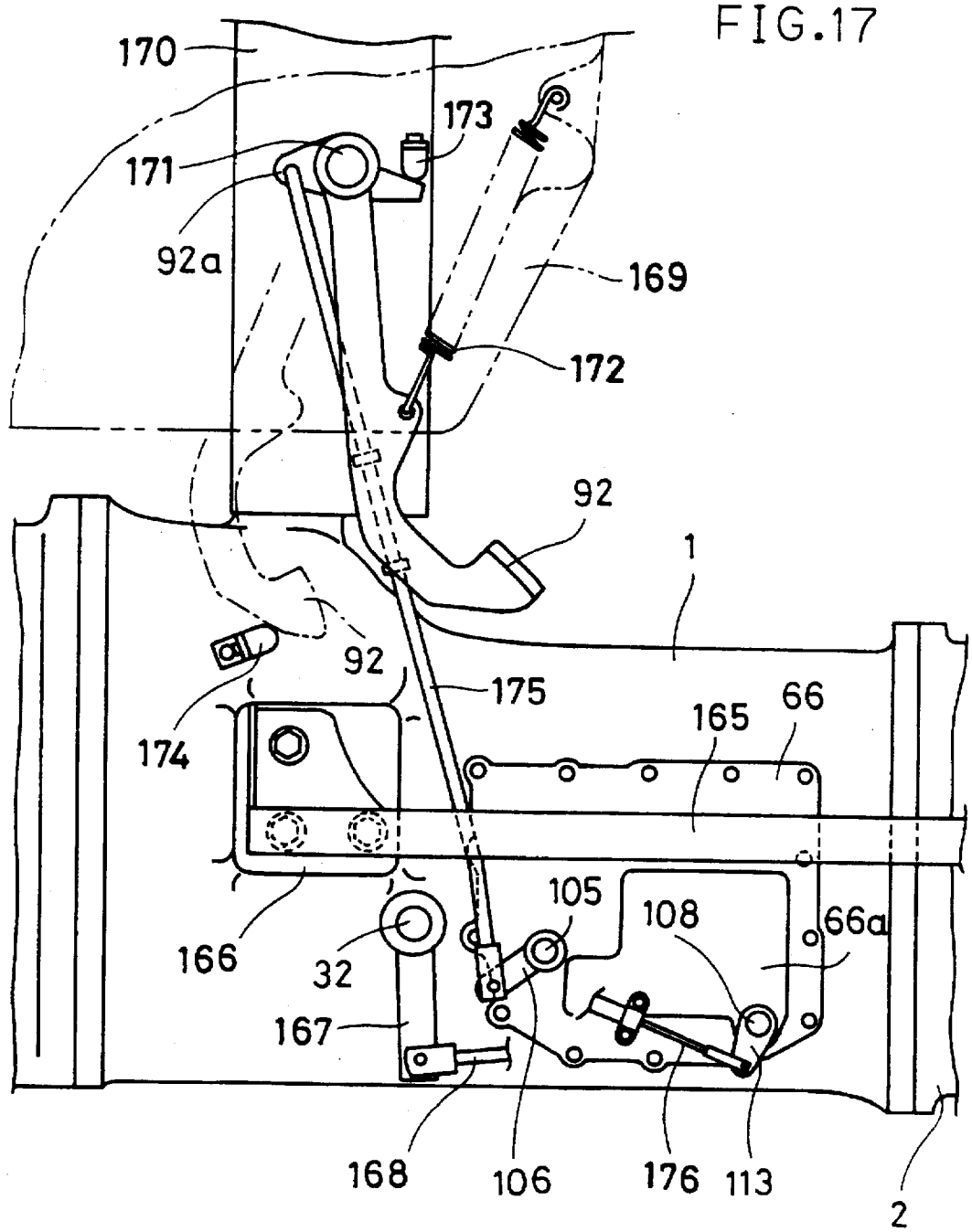
FIG. 17 is a side view of a part of the front housing shown in FIG. 3.

FIG. 17 illustrates a side view of an essential part of the front housing 1. As shown in this figure, a step 165 is arranged at an outer side of the outer housing member 66 with an interval therebetween and is fixedly secured to a mounting boss 166 on a side surface of the front housing 1 and to another mounting boss (not shown) on an outer surface on the transmission casing 2. The housing portion 66a is located under the step 165, and the above-referenced operating arms 106 and 113 are also located under the step 165. An operating arm 167 is attached to the control shaft 32 for operating the power take-off clutch set forth before by referring to FIG. 2 also at an underside of the step 165. This arm 167 is operatively connected to a power take-off clutch lever (not shown) through a rod 168. A column 170 is arranged at an inner side of an engine bonnet 169 and is fixedly mounted on an upper surface of the front housing 1. The pedal 92 for operating the pressure-reducing valve is supported rotatably about a support shaft 171 by the column 170. A return spring 172 for the pedal 92 is disposed between this pedal and the bonnet 169. A pair of stops 173 and 174 for limiting the movement of pedal 92 are fixedly disposed on a side surface of the column 170 and on a side surface of the front housing 1. The arm 106 for operating the pressure-reducing valve is connected through a rod 175 to an arm 92a which is co-rotatable with pedal 92. The arm 113 for operating the directional control valve is connected through a control cable 176 to a shifter lever 78a which is schematically shown in FIG. 8.

The primary speed change mechanism 15 and auxiliary speed change mechanism 18 shown in FIG. 1 will be outlined. The primary change mechanism 15 includes four gears 131, 132, 133 and 134 which are rotatably mounted on the drive shaft 13, and four gears 135, 136, 137 and 138 which are fixedly mounted on the change shaft 14 and are meshed respectively with the gears 131-134 on the drive shaft. Two double-acting synchronizer clutches 139 and 140 are mounted on the drive shaft 13 for selectively coupling gears 131-134 one at a time to the drive shaft. Consequently, this change mechanism 15 provides first to fourth change ratios.

As also shown in FIG. 1, the change shaft 14 is drivingly connected to the intermediate shaft 16 through a reduction gearing of meshing gears 142 and 143. Two changing gears 144 and 145 are fixedly mounted on the intermediate shaft 16, and two shift gears 146 and 147 meshable respectivly with gears 144 and 145 are slidably but non-rotatably mounted on the propeller shaft 17. A clutch 148 which can be engaged by displacing the shift gear 147 is disposed between the change shaft 17 and propeller shaft 17. Consequently, the auxiliary change mechanism 18 is operable to provide first to third change ratios by operating shift gears 146 and 147.

Figure 18:
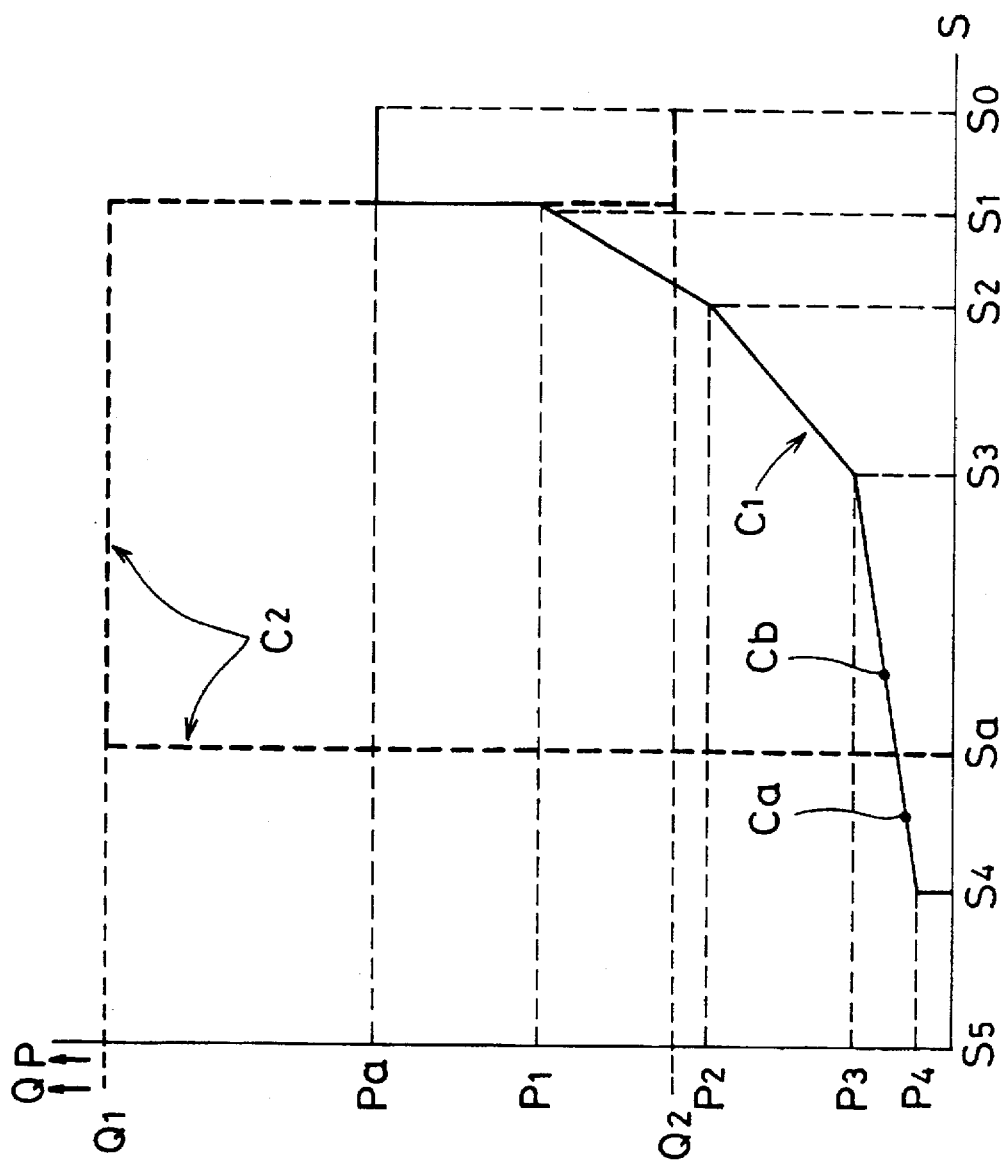
FIG. 18 is a schematic graph showing the operations of the reducing valve and of a lubricant-regulator valve mechanism shown in FIGS. 9 and 10.

FIG. 18 shows the operation of pressure-reducing valve 78 and the operation of lubricant-supply control mechanism including the flow control valve 90 and on-off valve 91 by schematic graphs. In FIG. 18, the horizontal axis represents the stroke S of reducing valve-operating pedal 92 in which $S_0$ designates the non-operated position of pedal (S=0) and $S_5$ designates the fully operated position of pedal (S=maximum). The vertical axis represents fluid pressure P applied to the clutch 54F or 54R and flow quantity of lubricant Q supplied to the clutch 54F or 54R. Change in the fluid pressure P is shown by Curve $C_1$ and change in flow quantity of lubricant Q is shown by Curve $C_2$ of dotted line.

As already described by referring to FIGS. 16a, 16b and 16c, the reducing valve 83 exhibits three pressure-reducing modes. When the pedal 92 has been trodden down from the position $S_0$ to a position $S_1$ shown in FIG. 18, the condition shown in FIG. 16a is attained and this condition is kept between positions $S_1$ and $S_2$ of pedal 92 shown. In this condition, fluid pressure P applied to the clutch is determined by the compression degree of spring 123 and by the compression degree of the thinly coiled portion 124a of spring 124 and a variable fluid pressure between $P_1$ and $P_2$ which is lower than the normal fluid pressure Pa can be obtained in response to the position of pedal 92. When the pedal has been further trodden down, the condition shown in FIG. 16b is attained and fluid pressure P is further reduced and can be variably controlled within the range between $P_2$ and $P_3$ by controlling the compression degree of spring 123 and the compression degree of the densely coiled portion 124b of spring 124 by varying the position of pedal 92 between positions $S_2$ and $S_3$. When the pedal has been further trodden down, the condition shown in FIG. 16c is attained and fluid pressure P is further reduced and can be variably controlled within the range between $P_3$ and $P_4$ by controlling the compression degree of spring 123 by varying the position of pedal 92 between positions $S_3$ and $S_4$. The point Ca on Curve $C_1$ represents the point where the piston 54d of clutch 54F or 54R has been moved maximumly whereby discs 54a and 54b have come in close contact with one another, and point Cb on Curve $C_1$ represents the point where clutch 54F or 54R has been fully engaged at the condition in which the primary and auxiliary speed change mechanisms 15 and 18 shown in FIG. 1 are shifted to the lowest speed ratio of the twelve speed ratios obtainable by the combination of these change mechanisms. Point Cb is displaced along Curve $C_1$ rightwards, as viewed in FIG. 16, as the change mechanisms 15 and 18 are shifted toward their combined high speed ratios and as load applied to the vehicle is increased. At the lowest speed ratio set forth above, a variable creeping speed of the vehicle due to a slippingly engaged condition of the clutch 54F or 54R can be obtained by adjusting the pedal 92 such that pressure control is effected on a point on Curve $C_1$ between the points Ca and Cb.

The load or strength of valve spring 91a of the on-off valve 91 is predetermined such that the valve 91 is displaced from its 'off' position to its 'on' position when fluid pressure in the fluid path 84, namely fluid pressure P applied to clutch 54F or 54R, is slightly higher than the pressure at the point Ca. Consequently, the on-off valve 91 will place the lubricant fluid path 88 in its open condition when the pedal 92 has been returned from its fully operated position $S_5$ to a position Sa shown in FIG. 18. On the other hand, the load or strength of valve spring 90b of the flow control valve 90 is predetermined such that when fluid pressure in the fluid path 84, namely fluid pressure P applied to clutch 54F or 54R, has been increased approximately to the normal fluid pressure Pa, the valve 90 is displaced to the position shown in FIG. 11 so that a portion of lubicant flow is drained from the lubricant fluid path 88 whereby flow quantity of lubricant Q is reduced from $Q_1$ to $Q_2$ shown in FIG. 18. It is thus seen that, in a condition where the pedal 92 is largely trodden down beyond the position Sa, no lubricant is supplied to the clutch 54F or 54R so that co-rotation of the fritional elements 54a and 54b due to the drag effect of viscous lubricant fluid is not caused whereby an unexpected start of the vehicle is well prevented. When the pedal 92 is returned from such a largely trodden-down position toward its original position via the position Sa so as to obtain an engaged condition of the clutch, a large quantity of lubricant $Q_1$ will be supplied to the clutch from the position Sa of pedal 92 so that heat generated due to the slipping engagement of clutch between points Ca and Cb is rapidly cooled off. After the fluid pressure P applied to clutch has been increased to the normal fluid pressure Pa, the flow quantity of lubricant Q is neither kept in the large value $Q_1$ nor made zero but is made a low value $Q_2$ so that a small quantity of lubricant is continuously supplied to the fully engaged clutch. By this, residual heat from the slipping engagement of clutch is cooled off so as to avoid wear of the frictional elements 54a and 54b and the quantity of lubricant fluid stirred by the rotating frictional elements 54a and 54b is reduced so as to depress loss of energy and rise of temperature. Because the flow control valve 90 and on-off valve 91 of the functions set forth above are separately provided, the starting point Sa of lubricant supply and low flow quantity of lubricant $Q_2$ can be determined independently of each other. In addition, the lubricant control mechanisms which are associated with clutches 54F and 54R and are illustrated in FIGS. 8 and 11 as valves 103 assure a sufficient supply of lubricant to the clutch under operation while limiting lubricant supply to the other cluch so as to minimize the drag effect of lubricant in this clutch.

Figure 19:
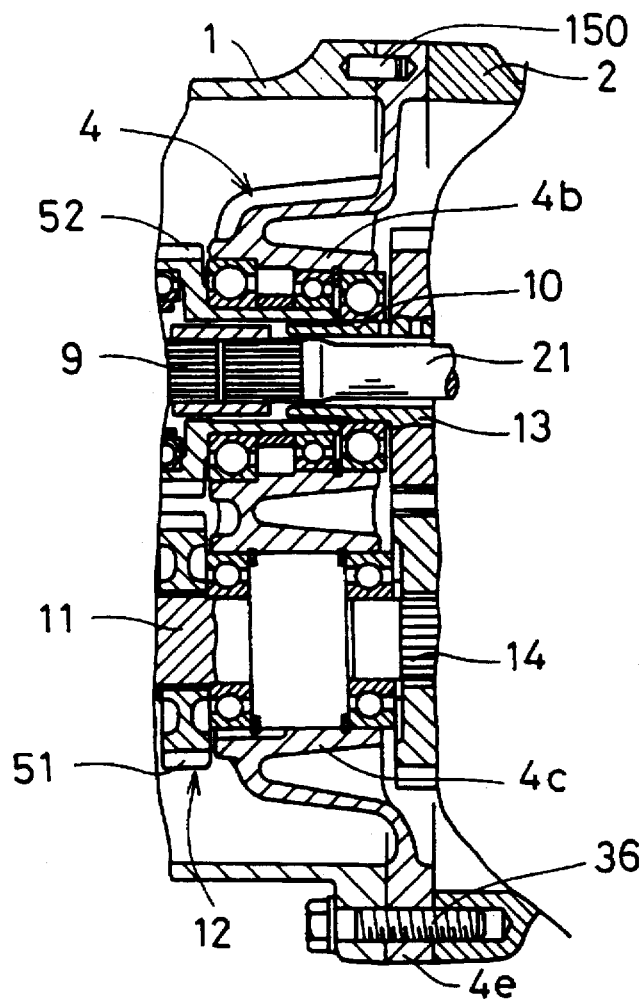
FIG. 19 is a sectional side view similar to a part of FIG. 3 but showing an alternative support structure for a bearing support frame according to the present invention.

In FIG. 19, there is shown another example of support structure for the bearing support frame 4. In this alternative embodiment, the bearing support frame 4 includes at its outer periphery an uninterruped flange 4e which is sandwiched between the front housing 1 and transmission casing 2 and are fastened together by bolts 36 for fastening the housing 1 and casing 2. Positioning and temporarily retaining pins 150 are disposed between the rear end of housing 1 and flange 4e, so that the additional speed change mechanism 12 only a rear end portion of which is shown in FIG. 19 can be assembled into the front housing 1 at a condition where the bearing support frame 4 is temporarily retained by the housing 1 using pins 150. The remainder parts of the embodiment shown in FIG. 19 are substantially identical with the corresponding parts of the embodiment shown in FIGS. 1 to 18.

Figure 20:
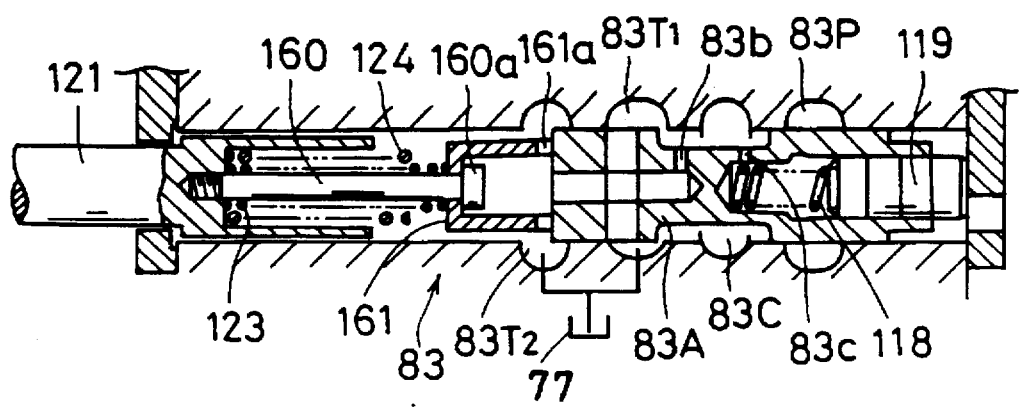
FIG. 20 is a sectional view similar to FIG. 14 but showing a modification of the pressure-reducing valve.

In FIG. 20, a modification of the pressure-reducing valve 83 is shown in its pressure-unloading position which corresponds to the position shown in FIG. 14. In this modification, an elongated pin 160 having a head 160a is attached to the contol rod 121 in place of the poppet 120. As a spring-receiving member in place of the ring 125, there is employed a sleeve 161 with which the pin head 160a is engaged from the opposite side of springs 123 and 124 at the condition shown. Orifice 161a which corresponds to the orifice 83e is formed in the sleeve 161. When the control rod 121 is pushed rearwards from the condition shown, the head 160a is spaced from the sleeve 161 so that the valve body 83A is biased by springs 123 and 124 through the sleeve 161. The other parts are substantially the same as the corresponding parts of the reducing valve 83 set forth before.

Figure 21:
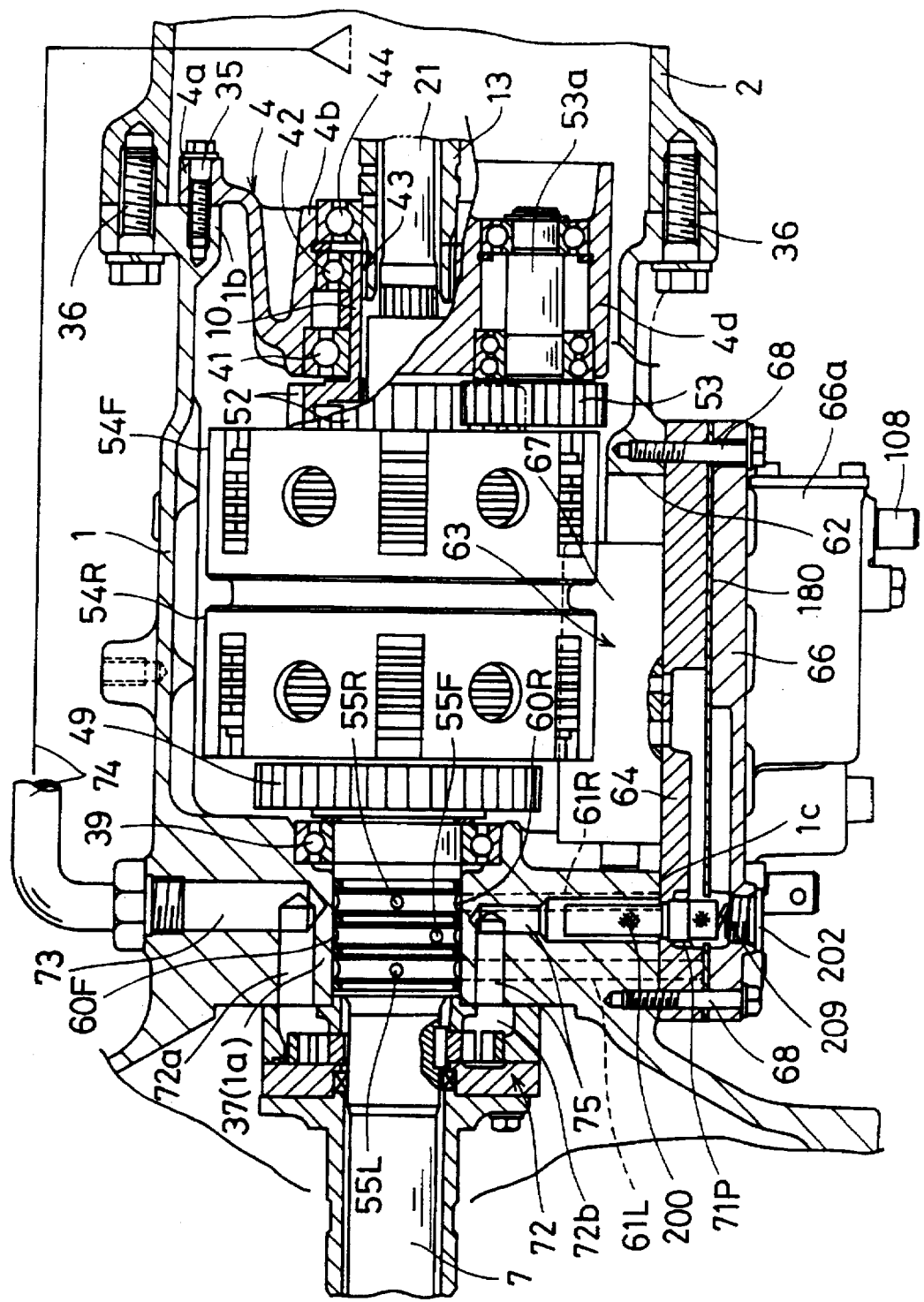
FIG. 21 is a sectional plane view similar to FIG. 4 but showing a second embodiment of the transmission assembly according to the present invention.
Figure 22:
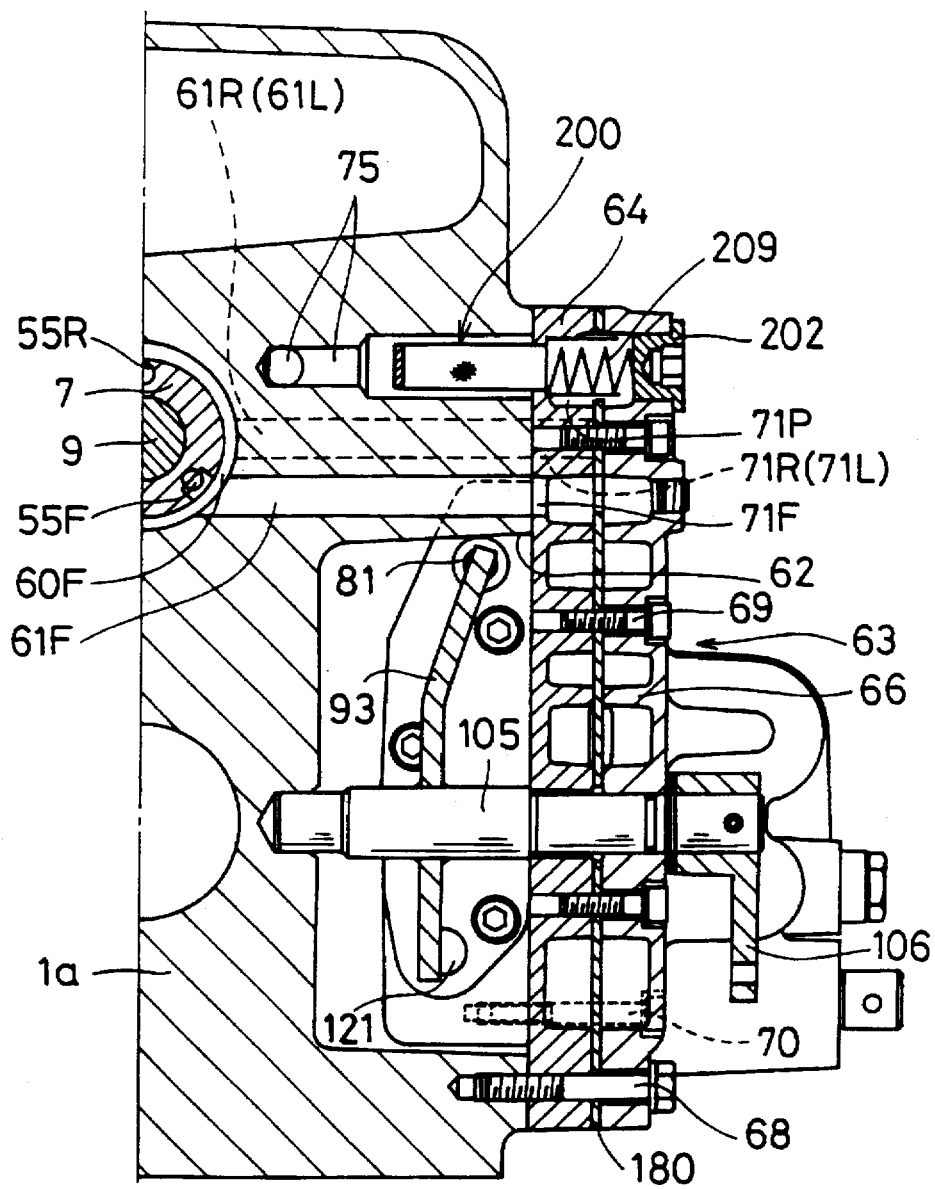
FIG. 22 is a sectional view similar to a right half of FIG. 6 but showing the second embodiment.

Referring now to FIGS. 21 to 25, there is shown a second preferred embodiment of the transmission assembly according to the present invention. As shown in FIGS. 21 and 22, this second embodiment is substantially the same as the first embodiment shown in FIGS. 1 to 18 with an exception that a hollow cylindrical filter 200 is disposed within the pump discharge passage 75 in the partition wall 1a for purifying fluid supplied from pump 72 to the control valve assembly 63.

Figure 25:
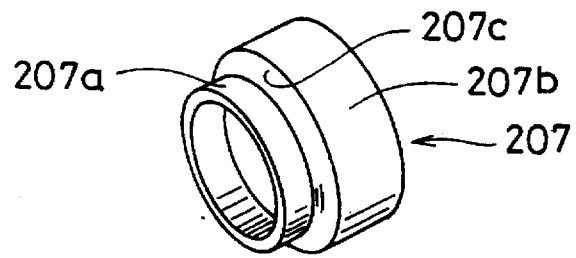
FIG. 25 is a perspective view of a retainer shown in FIGS. 23 and 24.
Figure 23:
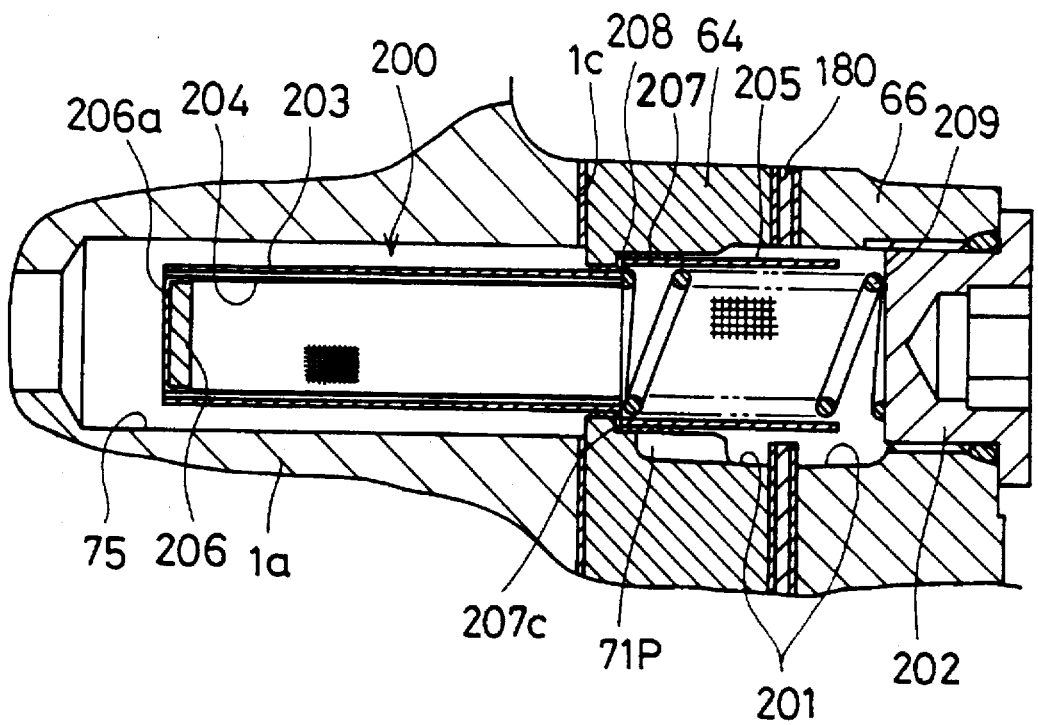
FIG. 23 is an enlarged sectional view of a part of FIG. 22, illustrating a filter shown in FIGS. 21 and 22 in great detail.

As shown in FIGS. 21 and 22, a partition plate 180 is sandwiched between the plate member 64 and outer housing member 66 of the valve housing of control valve assembly 63 and is fastened together with these members 64 and 66 to the front housing 1. As clearly shown in FIGS. 23 and 24, a thorough bore 201 is formed through the plate member 64, partition plate 180 and outer housing member 66 such that inlet or pump port 71P of the control valve assembly is provided by an inner end portion of the bore 201. An outer end of the thorough bore 201 is closed by a removable plug 202 which is threadingly engaged to the outer housing member 66. Filter 200 comprises outer and inner hollow cylindrical screens 203 and 204 which are located within the discharge passage 75, and a hollow cylindrical screen 205 which is located within the thorough bore 201. Of these screens, screens 203 and 205 have relatively large meshes while screen 204 has relatively fine meshes. A plug 206 with a seal 206a is attached to an innermost end of filter 200, and an annular retainer 207 of a sheet metal material is disposed between the outer screen 203 and the screen 205 which is larger in diameter than screen 203. As shown in FIG. 25, retainer 207 includes a tubular portion 207a of a smaller diameter which is adapted to fittingly receive an end portion of screen 203 and to be fixedly secured thereto by spot welding or the like, a tubular portion 207b of a larger diameter which is adapted to fittingly receive an end portion of screen 205 and to be fixedly secured thereto by spot welding or the like, and an annular shoulder portion 207c which connects between the tubular portions 207a and 207b. The plate member 64 includes an annular stepped portion 208 which is formed in the inner circumference of bore 201 at an innermost end portion of this bore such that the annular shoulder portion 207c on the filter 200 is sealingly engageable with the annular stepped portion 208. A coil spring 209 which is received at its base end by the plug 202 extends through an open base end of screen 205 and engages filter 200 at an inside of the shoulder portion 207c of the filter so as to bias the filter to move inwards and to thereby engage the shoulder portion 207c to the stepped portion 208, as shown in FIG. 23. Consequently, filter 200 is kept in the position shown in FIG. 23 by the biasing force of spring 209.

In the state shown in FIG. 23, fluid discharged from the pump 72 into the passage 75 flows through screens 203 and 204 with foreign matters or contaminants therein being filtered off by these screens and then into the pump port 71P mainly through the open base end of screen 205. Owing to this fluid-purifying operation of filter 200 at a location just before the control valve assembly 63, various valves in this assembly operate ia a reliable manner and are well protected from being damaged.

Figure 24:
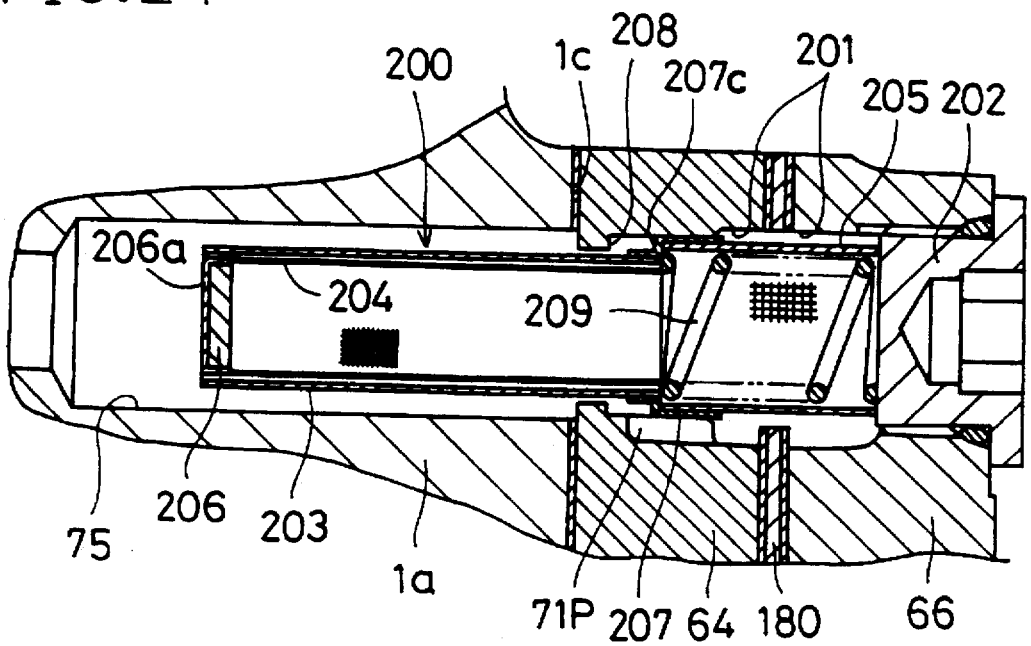
FIG. 24 is a sectional view similar to FIG. 23, showing a by-pass valve function of the filter.

With the use of the transmission assembly, screens 203 and 204 of the filter 200 become choked or clogged with foreign matters removed from fluid so that pressure differential across the filter is increased. The load of coil spring 209 is predetermined such that when the pressure differential exceeds a certain value the filter 200 is moved by fluid pressure applied to the inner end plug 206 against the biasing force of spring 209 so that the annular shoulder portion 207c of filter 200 leaves the annular stepped portion 208 in the plate member 64, as shown in FIG. 24. Pump port 71P includes at the inner circumference of bore 201 a recess or recesses which communicate directly with the pump discharge passage 75 at the condition shown in FIG. 24. As can be understood now, filter 200 is supported such that it is operable also as a by-pass valve which is displaced, when this filter becomes choked, so as to connect between the passage 75 and port 71P directly. Owing to this by-pass valve function, an overload which may be applied to the fluid pump 72 at a choked condition of filter 200 is well avoided. Further, shortage or interruption of fluid supply to the valve assembly 63 is not caused even at a choked condition of the filter. In the condition shown in FIG. 24, some fluid flowing into the filter 200 through the choked screens 203 and 204 flows out through screen 205 with foreign matters therein being filtered off by this screen. The condition shown in FIG. 24 can be detected using a sensor (not shown), and filter 200 can be taken out easily for a cleaning or exchanging purpose by removing the threaded plug 202.

In FIGS. 21 to 25, parts corresponding to those of the first embodiment shown in FIGS. 1 to 18 are designated by like numerals. As shown in FIGS. 23 and 24, sealing sheets are interposed respectively between the plate member 64 and partition plate 180, between the partition plate 180 and outer housing member 66, and between the outer surface 1c of front housing 1 and the plate member 64.

Figure 26:
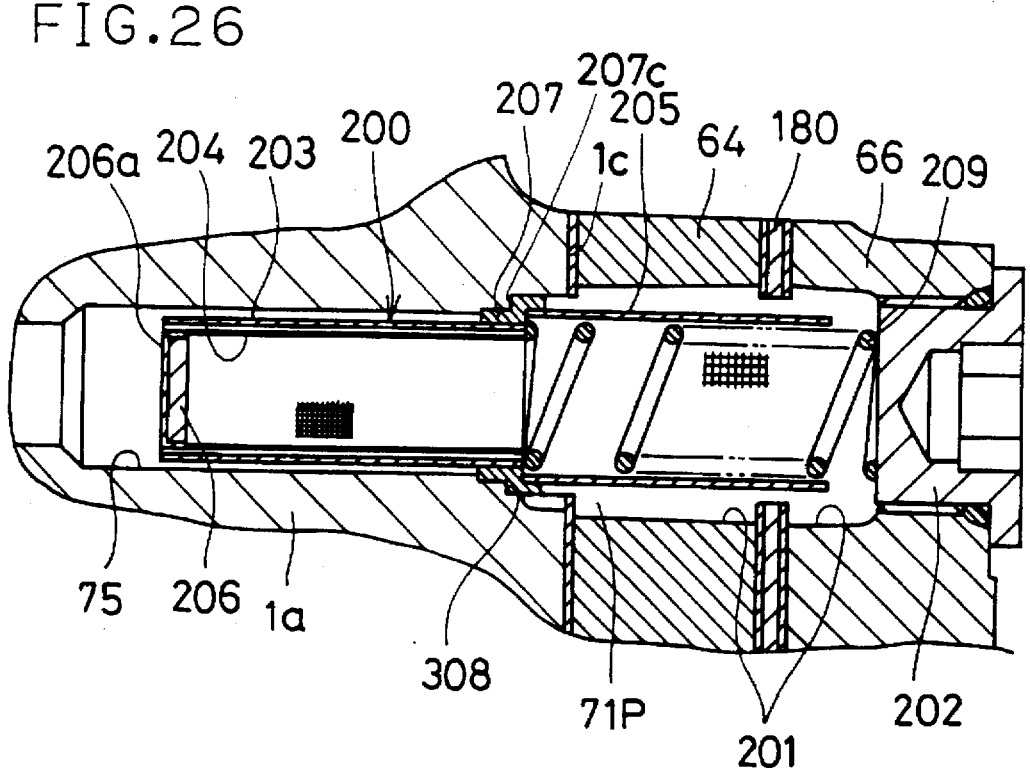
FIG. 26 is a sectional view similar to FIG. 23 but showing another support structure for the filter.

In FIG. 26, there is shown another structure for supporting the filter 200. In this support structure, an annular stepped portion 208 which corresponds to the stepped portion 208 shown in FIGS. 23 and 24 is formed in the inner circumference of discharge passage 75. Retainer 207 is adapted to sealingly engage this stepped portion 308 under the biasing of coil spring 209. The other parts are substantially the same as the correponding parts shown in FIGS. 23 to 25.

Figure 27:
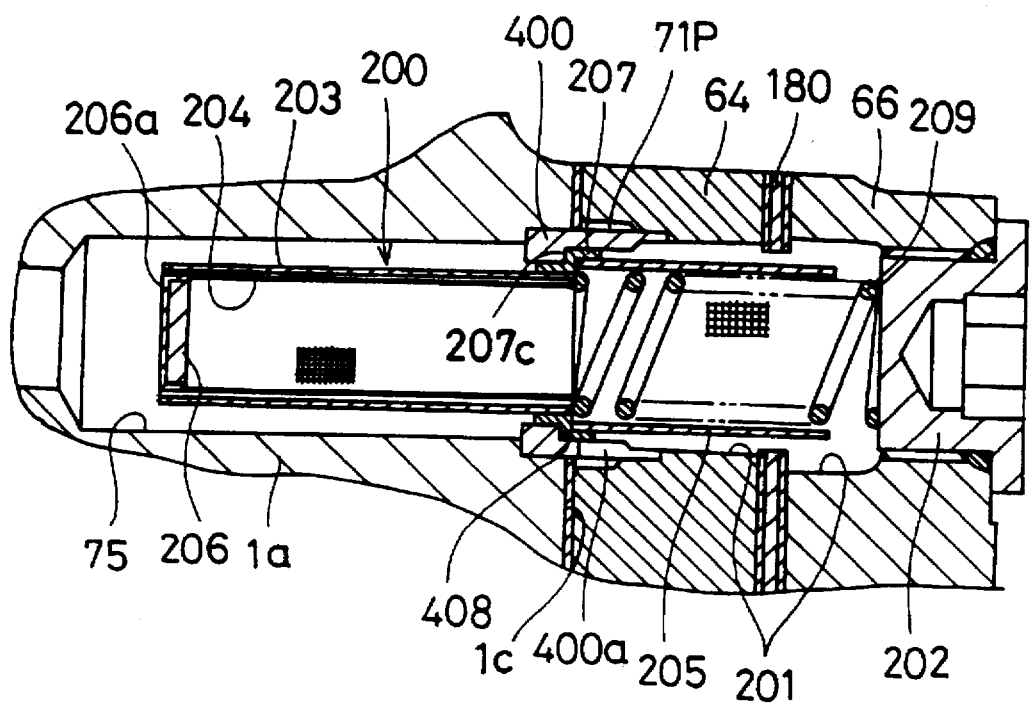
FIG. 27 is a sectional view similar to FIG. 23 but showing still another support structure for the filter.

In FIG. 27, there is shown still another structure for supporting the filter 200. In this support structure, passage 75 and bore 201 include mutually aligned diameter-enlarged portions in which a hollow positioning pin 400 is fitted so as to positioning the valve housing including the plate member 64 relative to the partition wall 1a. Pin 400 includes in its inner circumference an annular stepped portion 408 which corresponds to each of the above-referenced stepped portions 208 and 308. The retainer 207 of filter 200 is adapted to sealingly engage this stepped portion 408 under the biasing of coil spring 209. Pin 400 further includes a slot 400a which is operable as a by-pass passage when the filter 200 is displaced rightwards, as viewed in FIG. 27, against the biasing force of spring 209. The other parts are substantially the same as the correponding parts shown in FIGS. 23 to 25.

Each of the structures shown in FIGS. 26 and 27 provides the same advantages as the structure shown in FIGS. 23 and 24.

While preferred embodiments of the invention have been described, it will be appreciated that various modifications and changes may be made without departing from the spirit and scope of the appended claims.

I claim:

1. A transmission assembly for tractors which comprises:
   a front housing (1) including an open rear end;
   a first speed change mechanism (12) disposed within said front housing (1);
   a transmission casing (2) including an open front end and being fastened to the rear end of said front housing (1);
   a second speed change mechanism (15) disposed within said transmission casing (2), said second speed change mechanism being connected to said first speed change mechanism (12) such that said second speed change mechanism is powered by said first speed change mechanism; and
   a bearing support frame (4) disposed within a rear end portion of said front housing for supporting a rear end portion of said first speed change mechanism (12), said bearing support frame being fixedly secured to said front housing (1) using bolts (35) each having a head portion which is located within a front end portion of said transmission casing (2).

2. The transmission assembly as set forth in claim 1, wherein said front housing (1) includes an internal partition wall (1a), and wherein said first speed change mechanism (12) comprises a primary shaft (7) supported by said partition wall, an output shaft (20) supported by said bearing support frame (4), and a fluid-operated clutch means (54F, 54R) operative to transmit power from said primary shaft to said output shaft, said clutch means being adapted to be controlled by a control valve means (63).

3. The transmission assembly as set forth in claim 2, wherein said clutch means comprises plural fluid-operated clutches (54F, 54R) for providing plural speed change ratios between said primary shaft (7) and said output shaft (20), said control valve means (63) including a directional control valve (78) for controlling supply of a pressurized fluid to said plural fluid-operated clutches.

4. The transmission assembly as set forth in claim 2, wherein said clutch means comprises at least one fluid-operated clutch (54F, 54R) which is adapted to be slippingly engaged under a controlled fluid pressure applied thereto, said control valve means (63) including a pressure-reducing valve (83) for variably controlling fluid pressure applied to said fluid-operated clutch such that said fluid-operated clutch is shifted between a fully engaged condition and a disengaged condition through a slippingly engaged condition.

5. The transmission assembly as set forth in claim 2, wherein said clutch means comprises at least one fluid-operated clutch (54F, 54R) which is mounted on said primary shaft (7), wherein said control valve means (63) is fixedly supported by said front housing (1), and wherein said internal partition wall (1a) includes a hollow cylindrical portion (37) which encloses an axial mid portion of said primary shaft, at least one annular fluid chamber (60F, 60R) being defined between said cylindrical portion and said primary shaft for conducting fluid to and from said fluid-operated clutch through at least one fluid passage (61F, 61R) in said primary shaft.

6. A transmission assembly for tractors which comprises:
   a front housing (1) including an open rear end;
   a first speed change mechanism (12) disposed within said front housing (1);
   a transmission casing (2) including an open front end and being fastened to the rear end of said front housing (1);
   a second speed change mechanism (15) disposed within said transmission casing (2), said second speed change mechanism being connected to said first speed change mechanism (12) such that said second speed change mechanism is powered by said first speed change mechanism; and
   a bearing support frame (4) disposed at a location between said first and second speed change mechanisms (12, 15) for supporting a rear end portion of said first speed change mechanism (12) and for supporting a front end portion of said second speed change mechanism (15), said bearing support frame being fixedly secured to said front housing (1) using bolts (35) each having a head portion which is located within a front end portion of said transmission casing (2).

7. The transmission assembly as set forth in claim 6, wherein said bearing support frame (4) is adapted to support said rear end portion of said first speed change mechanism (12) and said front end portion of said second speed change mechanism (15) at a location within said front housing (1).

8. The transmission assembly as set forth in claim 6, wherein said front housing (1) includes an internal partition wall (1a), and wherein said first speed change mechanism (12) comprises a primary shaft (7) supported by said partition wall, an output shaft (20) supported by said bearing support frame (4), and a fluid-operated clutch means (54F, 54R) operative to transmit power from said primary shaft to said output shaft, said clutch means being adapted to be controlled by a control valve means (63).

9. The transmission assembly as set forth in claim 8, wherein said clutch means comprises plural fluid-operated clutches (54F, 54R) for providing plural speed change ratios between said primary shaft (7) and said output shaft (20), said control valve means (63) including a directional control valve (78) for controlling supply of a pressurized fluid to said plural fluid-operated clutches.

10. The transmission assembly as set forth in claim 8, wherein said clutch means comprises at least one fluid-operated clutch (54F, 54R) which is adapted to be slippingly engaged under a controlled fluid pressure applied thereto, said control valve means (63) including a pressure-reducing valve (83) for variably controlling fluid pressure applied to said fluid-operated clutch such that said fluid-operated clutch is shifted between a fully engaged condition and a disengaged condition through a slippingly engaged condition.

11. The transmission assembly as set forth in claim 8, wherein said clutch means comprises at least one fluid-operated clutch (54F, 54R) which is mounted on said primary shaft (7), wherein said control valve means (63) is fixedly supported by said front housing (1), and wherein said internal partition wall (1a) includes a hollow cylindrical portion (37) which encloses an axial mid portion of said primary shaft, at least one annular fluid chamber (60F, 60R) being defined between said cylindrical portion and said primary shaft for conducting fluid to and from said fluid-operated clutch through at least one fluid passage (61F, 61R) in said primary shaft.

12. A transmission assembly for tractors which comprises:
   a front housing (1) including an open rear end;
   a first speed change mechanism (12) disposed within said front housing (1);
   a transmission casing (2) including an open front end and being fastened to the rear end of said front housing (1);
   a second speed change mechanism (15) disposed within said transmission casing (2), said second speed change mechanism being connected to said first speed change mechanism (12) such that said second speed change mechanism is powered by said first speed change mechanism; and
   a bearing support frame (4) disposed within a rear end portion of said front housing (1) for supporting a rear end portion of said first speed change mechanism (12), said bearing support frame including outwardly extending integral projections (4a) which are adapted to abut against bosses (1b) projected inwardly from a rear end portion of said front housing, said projections being fixedly secured to said bosses (1b) using bolts (35) each having a head portion which is located within a front end portion of said transmission casing (2).

13. The transmission assembly as set forth in claim 12, wherein said integral projections (4a) extend from a rear end portion of said baring support frame (4) such that said projections are located within a front end portion of said transmission casing (2).

14. The transmission assembly as set forth in claim 13, wherein said integral projections (4a) are adapted to abut against said bosses (1b) in a vertical plane at which said front housing (1) and said transmission casing (2) are jointed with each other.

15. The transmission assembly as set forth in claim 12, wherein said front housing (1) includes an internal partition wall (1a), and wherein said first speed change mechanism (12) comprises a primary shaft (7) supported by said partition wall, an output shaft (20) supported by said bearing support frame (4), and a fluid-operated clutch means (54F, 54R) operative to transmit power from said primary shaft to said output shaft, said clutch means being adapted to be controlled by a control valve means (63).

16. The transmission assembly as set forth in claim 15, wherein said clutch means comprises plural fluid-operated clutches (54F, 54R) for providing plural speed change ratios between said primary shaft (7) and said output shaft (20), said control valve means (63) including a directional control valve (78) for controlling supply of a pressurized fluid to said plural fluid-operated clutches.

17. The transmission assembly as set forth in claim 15, wherein said clutch means comprises at least one fluid-operated clutch (54F, 54R) which is adapted to be slippingly engaged under a controlled fluid pressure applied thereto, said control valve means (63) including a pressure-reducing valve (83) for variably controlling fluid pressure applied to said fluid-operated clutch such that said fluid-operated clutch is shifted between a fully engaged condition and a disengaged condition through a slippingly engaged condition.

18. The transmission assembly as set forth in claim 15, wherein said clutch means comprises at least one fluid-operated clutch (54F, 54R) which is mounted on said primary shaft (7), wherein said control valve means (63) is fixedly supported by said front housing (1), and wherein said internal partition wall (1a) includes a hollow cylindrical portion (37) which encloses an axial mid portion of said primary shaft, at least one annular fluid chamber (60F, 60R) being defined between said cylindrical portion and said primary shaft for conducting fluid to and from said fluid-operated clutch through at least one fluid passage (61F, 61R) in said primary shaft.

19. A transmission assembly for tractors which comprises:
   a front housing (1) including an open rear end;
   a first speed change mechanism (12) disposed within said front housing (1);
   a transmission casing (2) including an open front end and being fastened to the rear end of said front housing (1);
   a second speed change mechanism (15) disposed within said transmission casing (2), said second speed change mechanism being connected to said first speed change mechanism (12) such that said second speed change mechanism is powered by said first speed change mechanism; and
   a bearing support frame (4) disposed at a location between said first and second speed change mechanism (12, 15) for supporting a front end portion of said first speed change mechanism (12) and for supporting a front end portion of said second speed change mechanism (15), said bearing support frame including outwardly extending integral projections (4a) which are adapted to abut against bosses (1b) projected inwardly from a rear end portion of said front housing, said projections being fixedly secured to said bosses (1b) using bolts (35) each having a head portion which is located within a front end portion of said transmission casing (2).

20. The transmission assembly as set forth in claim 19, wherein said bearing support frame (4) is adapted to support said rear end portion of said first speed change mechanism (12) and said front end portion of said second speed change mechanism (15) at a location within said front housing (1), said integral projections (4a) extending from a rear end portion of said bearing support frame such that said projections are located within a front end portion of said transmission casing (2).

21. The transmission assembly as set forth in claim 20, wherein said integral projections (4a) are adapted to abut against said bosses (1b) in a vertical plane at which said front housing (1) and said transmission casing (2) are jointed with each other.

22. The transmission assembly as set forth in claim 19, wherein said transmission front housing (1) includes an internal partition wall (1a), and wherein said first speed change mechanism (12) comprises a primary shaft (7) supported by said partition wall, an output shaft (20) supported by said bearing support frame (4), and a fluid-operated clutch means (54F, 54R) operative to transmit power from said primary shaft to said output shaft, said clutch means being adapted to be controlled by a control valve means (63).

23. The transmission assembly as set forth in claim 22, wherein said clutch means comprises plural fluid-operated clutches (54F, 54R) for providing plural speed change ratios between said primary shaft (7) and said output shaft (20), said control valve means (63) including a directional control valve (78) for controlling supply of a pressurized fluid to said plural fluid-operated clutches.

24. The transmission assembly as set forth in claim 22, wherein said clutch means comprises at least one fluid-operated clutch (54F, 54R) which is adapted to be slippingly engaged under a controlled fluid pressure applied thereto, said control valve means (63) including a pressure-reducing valve (83) for variably controlling fluid pressure applied to said fluid-operated clutch such that said fluid-operated clutch is shifted between a fully engaged condition and a disengaged condition through a slippingly engaged condition.

25. The transmission assembly as set forth in claim 22, wherein said clutch means comprises at least one fluid-operated clutch (54F, 54R) which is mounted on said primary shaft (7), wherein said control valve means (63) is fixedly supported by said front housing (1), and wherein said internal partition wall (1a) includes a hollow cylindrical portion (37) which encloses an axial mid portion of said primary shaft, at least one annular fluid chamber (60F, 60R) being defined between said cylindrical portion and said primary shaft for conducting fluid to and from said fluid-operated clutch through at least one fluid passage (61F, 61R) in said primary shaft.

* * * * *